US010298525B2

(12) United States Patent
Sakai

(10) Patent No.: US 10,298,525 B2
(45) Date of Patent: May 21, 2019

(54) INFORMATION PROCESSING APPARATUS AND METHOD TO EXCHANGE MESSAGES

(71) Applicant: SONY CORPORATION, Tokyo (JP)

(72) Inventor: Yusuke Sakai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 153 days.

(21) Appl. No.: 14/320,810

(22) Filed: Jul. 1, 2014

(65) Prior Publication Data
US 2015/0019657 A1    Jan. 15, 2015

(30) Foreign Application Priority Data

Jul. 10, 2013  (JP) ................................. 2013-144501

(51) Int. Cl.
*H04L 12/58* (2006.01)
*H04N 7/15* (2006.01)
*H04L 12/18* (2006.01)

(52) U.S. Cl.
CPC .......... *H04L 51/10* (2013.01); *H04L 12/1831* (2013.01); *H04N 7/15* (2013.01)

(58) Field of Classification Search
CPC ..... H04L 51/10; H04L 51/16; H04L 12/1831; H04L 12/58; H04L 12/1813; H04L 12/1822; H04L 12/581; H04L 51/04; H04L 65/403; H04L 12/1827; H04L 29/04; H04L 51/046; H04L 51/20; H04L 51/24; H04L 67/02; H04L 67/38; H04N 7/15; H04N 21/431; H04N 21/44; H04N 21/44004; H04N 21/44008; H04N 21/44012; H04N 21/44016; H04N 21/440227; H04N 21/440245; H04N 21/44029; H04N 5/262; H04N 5/2621; H04N 5/2624;
(Continued)

(56) References Cited

U.S. PATENT DOCUMENTS 6,201,581 B1 * 3/2001 Moriwake ............ G11B 27/034
                                                   348/587
2004/0080611 A1    4/2004 Kakii et al.
(Continued)

FOREIGN PATENT DOCUMENTS

JP       10-260808 A      9/1998
JP     2005-142818 A      6/2005
(Continued)

OTHER PUBLICATIONS

EP Search Report issued for Application No. 14171532.6, dated Jan. 8, 2015, pp. 1-5.
(Continued)

*Primary Examiner* — Greg C Bengzon
(74) *Attorney, Agent, or Firm* — Chip Law Group

(57) ABSTRACT

An information processing apparatus includes a message registering unit and a message reproducing unit. The message registering unit is configured to register a first message with video of a first user, the first message being a notification from the first user to a second user who is not in the same space with the first user at the same time. The message reproducing unit is configured to reproduce a second message with video in which the first user and the second user are present at the same time, the second message being a response to the first message from the second user.

12 Claims, 20 Drawing Sheets

(58) Field of Classification Search
CPC .... H04N 5/2625; H04N 5/2628; H04N 5/265; H04N 5/272; H04N 5/2723; H04N 21/2668; H04N 21/42222; H04N 21/44218; H04N 21/47202; H04N 21/4788; H04N 21/6582; H04N 7/157; H04N 7/147; H04N 7/144; H04N 7/152; H04N 21/472; H04N 19/40; H04N 21/4312; H04N 21/4786; H04N 21/6587; H04N 7/141; H04N 19/17; H04N 19/172; H04N 21/6125; H04N 5/45; H04N 21/47205; H04N 5/2224; H04N 1/00244; H04N 1/00307; H04N 21/4438; H04N 7/142; H04N 19/30; H04N 19/587; H04N 19/59; H04N 19/89; H04N 21/234327; H04N 21/2662; H04N 21/42203; H04N 21/4223; H04N 21/440263; H04N 21/8451; G06T 19/006; G06T 19/20; G09B 5/06; G06Q 10/107; G06Q 50/22; G06Q 10/10; G06Q 10/101; H04W 4/12; H04W 4/02; H04M 1/72555; H04M 2203/1025; A63F 13/12; A63F 2300/407; A63F 2300/537; A63F 2300/632; A63F 2300/638; A63F 2300/807; A63F 2300/1093; A63F 2300/577; A63F 2300/695; A63F 2300/8082; G06K 9/00268; G06K 9/00335; G06K 9/00604; G06K 9/00711; G06K 9/3216; G06F 17/30873; G06F 2203/0381; G06F 3/011; G06F 3/013; G06F 3/016; G06F 3/0304
See application file for complete search history.

(56) References Cited

U.S. PATENT DOCUMENTS

| | | | | |
|---|---|---|---|---|
| 2005/0008240 A1* | 1/2005 | Banerji | H04N 5/2624 | 382/238 |
| 2007/0174774 A1* | 7/2007 | Lerman | G06F 17/30017 | 715/723 |
| 2008/0246834 A1* | 10/2008 | Lunde | H04N 7/142 | 348/14.09 |
| 2008/0317439 A1* | 12/2008 | Wong | H04N 21/235 | 386/241 |
| 2009/0235364 A1* | 9/2009 | Cohen | G06Q 10/101 | 726/28 |
| 2009/0248300 A1* | 10/2009 | Dunko | H04L 67/38 | 701/533 |
| 2010/0027961 A1* | 2/2010 | Gentile | G06T 5/50 | 386/278 |
| 2010/0085416 A1* | 4/2010 | Hegde | H04N 7/147 | 348/14.08 |
| 2010/0128121 A1* | 5/2010 | Wilkinson | H04N 5/272 | 348/135 |
| 2010/0171807 A1* | 7/2010 | Tysso | H04N 7/152 | 348/14.09 |
| 2010/0171848 A1* | 7/2010 | Peters | G06K 9/00248 | 348/239 |
| 2010/0188478 A1* | 7/2010 | Robinson | H04N 7/15 | 348/14.16 |
| 2010/0302446 A1* | 12/2010 | Mauchly | H04N 7/147 | 348/598 |
| 2011/0008017 A1* | 1/2011 | Gausereide | G11B 27/034 | 386/280 |
| 2011/0090302 A1* | 4/2011 | Leviav | H04N 7/152 | 348/14.09 |
| 2011/0217021 A1* | 9/2011 | Dubin | H04N 7/147 | 386/278 |
| 2011/0242277 A1* | 10/2011 | Do | H04N 5/272 | 348/43 |
| 2012/0066596 A1* | 3/2012 | Feng | H04N 7/15 | 715/719 |
| 2012/0092438 A1* | 4/2012 | Guzman Suarez | H04N 7/15 | 348/14.03 |
| 2012/0287224 A1* | 11/2012 | Paris | H04N 7/147 | 348/14.08 |
| 2012/0308209 A1* | 12/2012 | Zaletel | G11B 27/034 | 386/278 |
| 2012/0314077 A1* | 12/2012 | Clavenna, II | H04N 21/2187 | 348/159 |
| 2012/0327183 A1* | 12/2012 | Fujii | H04L 12/1827 | 348/14.12 |
| 2013/0055112 A1* | 2/2013 | Joseph | G06Q 10/107 | 715/758 |
| 2013/0081082 A1* | 3/2013 | Riveiro Insua | H04N 21/8549 | 725/38 |
| 2013/0101164 A1* | 4/2013 | Leclerc | G06T 11/00 | 382/103 |
| 2013/0139193 A1* | 5/2013 | Fan | H04N 7/157 | 725/14 |
| 2013/0162773 A1* | 6/2013 | Tian | H04N 19/597 | 348/43 |
| 2013/0265382 A1* | 10/2013 | Guleryuz | G06T 11/60 | 348/14.08 |
| 2013/0307997 A1* | 11/2013 | O'Keefe | H04L 51/10 | 348/207.1 |
| 2014/0139609 A1* | 5/2014 | Lu | H04N 7/15 | 348/14.03 |
| 2014/0215512 A1* | 7/2014 | Maruyama | H04N 21/435 | 725/34 |
| 2014/0228118 A1* | 8/2014 | Hardy | G06T 19/006 | 463/31 |
| 2014/0229866 A1* | 8/2014 | Gottlieb | H04L 65/403 | 715/758 |
| 2014/0232816 A1* | 8/2014 | Wilson | H04N 7/157 | 348/14.08 |
| 2014/0233913 A1* | 8/2014 | Scharer, III | H04N 5/272 | 386/278 |
| 2014/0280626 A1* | 9/2014 | Girish | H04L 51/10 | 709/206 |
| 2014/0368669 A1* | 12/2014 | Talvala | H04N 5/272 | 348/207.1 |
| 2015/0325040 A1* | 11/2015 | Stirbu | G06T 19/006 | 345/421 |

FOREIGN PATENT DOCUMENTS

| | | |
|---|---|---|
| JP | 2010-268305 A | 11/2010 |
| JP | 2011-228913 | 11/2011 |
| JP | 2011-228913 A | 11/2011 |

OTHER PUBLICATIONS

Office Action for JP Patent Application No. 2013-144501, dated Jan. 5, 2017, 4 pages (3 pages English translation).

Office Action for JP Patent Application No. 2013-144501, dated Jun. 13, 2017, 05 pages of Office Action and 03 pages of English Translation.

Office Action for CN Patent Application No. 2014103142362, dated Jun. 4, 2018, 14 pages of Office Action and 17 pages of English Translation.

* cited by examiner

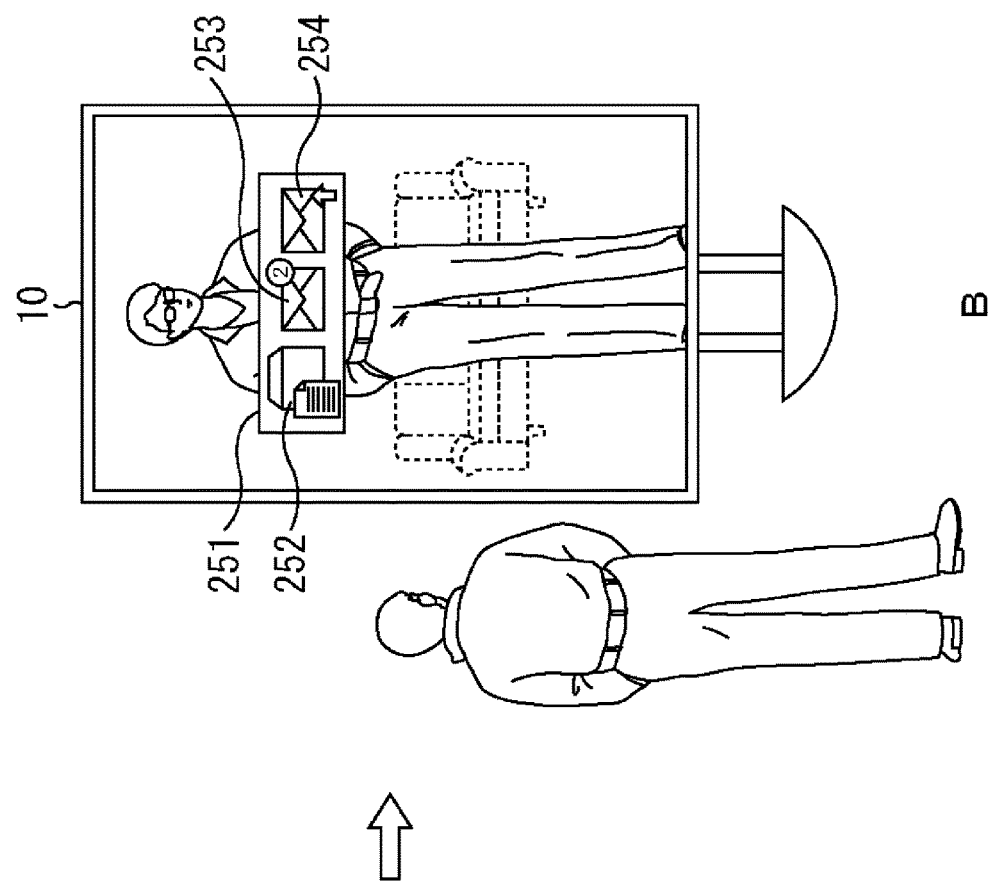
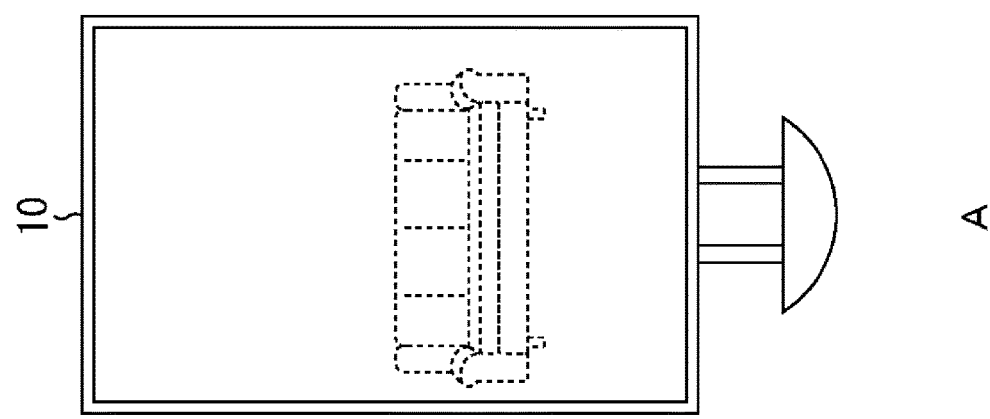
FIG.6

| Time | Source user | Destination user | Content of video message |
|---|---|---|---|
| $t_0$ | A | All | "We have some ice cream in the fridge" |
| $t_1$ | B, C | A | "Ice cream was yummy!" |
| $t_2$ | D | M | "Welcome back, daddy" |
| ...... | ...... | ...... | ...... |
| now | M | D | "Thank you" |

232 Message database

FIG.14

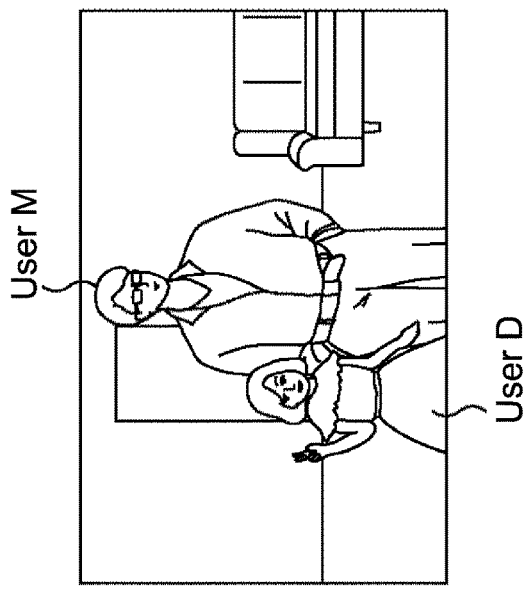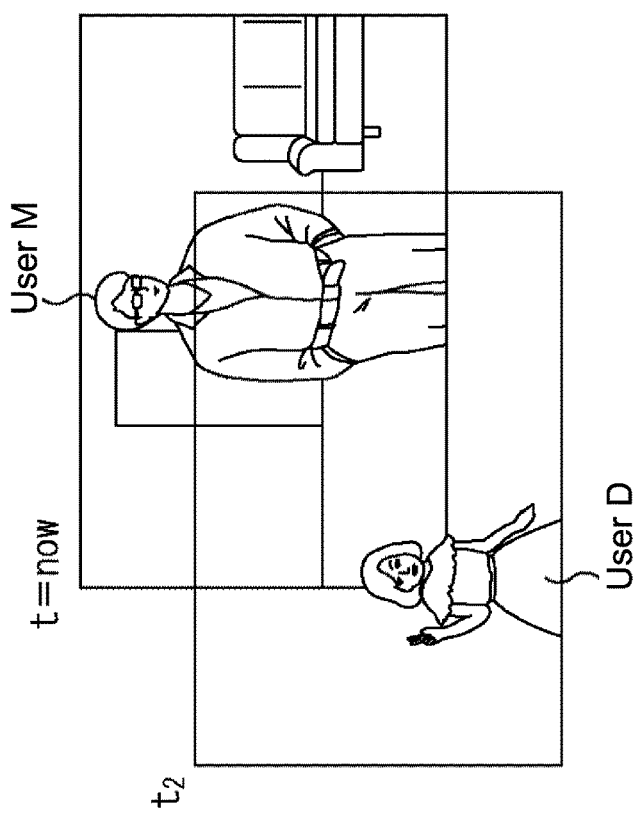
FIG.18

INFORMATION PROCESSING APPARATUS AND METHOD TO EXCHANGE MESSAGES

CROSS REFERENCE TO RELATED APPLICATIONS

This application claims the benefit of Japanese Priority Patent Application JP 2013-144501 filed Jul. 10, 2013, the entire contents of which are incorporated herein by reference.

BACKGROUND

The present disclosure relates to an information processing apparatus, an information processing method, and a program, and more particularly to an information processing apparatus, an information processing method, and a program that are capable of causing users who are not on the scene to exchange messages with each other.

Recording a video message of a user himself/herself in a recording medium and mailing the recording medium to another person, i.e., a so-called video letter, has been known. Furthermore, a movie distribution system capable of distributing a video message to another apparatus in an environment connectable to the Internet without the need of mailing it unlike the video letter has been proposed (see, for example, Japanese Patent Application Laid-open No. 2003-078901).

SUMMARY

With the existing technique, however, because a source user speaks to a destination user unilaterally in a video message, it may be impossible to make interactive communication between users even if the video message is reproduced, although the video massage can be sent to another person. For that reason, there has been a demand for allowing users who are not on the scene to exchange messages with each other.

The present disclosure has been made in view of the above circumstances, and it is desirable to allow users who are not on the scene to exchange messages with each other.

According to an embodiment of the present disclosure, there is provided an information processing apparatus including a message registering unit configured to register a first message with video of a first user, the first message being a notification from the first user to a second user who is not in the same space with the first user at the same time, and a message reproducing unit configured to reproduce a second message with video in which the first user and the second user are present at the same time, the second message being a response to the first message from the second user.

The second message includes composite video obtained by combining video of the first user and video of the second user.

The message reproducing unit is configured to reproduce the first message, and the message registering unit is configured to register the second message while the first message is reproduced.

In the composite video, the video of the first user and the video of the second user are in the same space.

The message registering unit is configured to separate the video of each user from background video and to register the first message, and the message reproducing unit is configured to reproduce the composite video obtained by combining video of a plurality of users with background video.

The information processing apparatus further includes a position detection unit configured to detect a position of a user in space, in which the message reproducing unit is configured to reproduce the composite video in which video of the user is adjusted depending on the detected position of the user.

A display position of the video of the user in the composite video is adjusted depending on the detected position of the user.

Transparency of the video of the user in the composite video is adjusted depending on the detected position of the user.

Arrangement order of the video of the user in the composite video is adjusted depending on registration time of a message.

Arrangement order of the video of the user in the composite video is adjusted depending on user's setting.

The message reproducing unit is configured to reproduce the composite video that is adjusted, in a case where video of a plurality of users is overlapped with each other, so that video of each user is not overlapped with each other.

According to an embodiment of the present disclosure, there is provided an information processing method or a program, which corresponds to the information processing apparatus according to the embodiment of the present disclosure.

In the information processing apparatus, the information processing method, and the program according to an embodiment of the present disclosure, a first message with video of a first user is registered, the first message being a notification from the first user to a second user who is not in the same space with the first user at the same time, and a second message with video in which the first user and the second user are present at the same time is reproduced, the second message being a response to the first message from the second user.

According to an embodiment of the present disclosure, it is possible to allow users who are not on the scene to exchange messages with each other.

These and other objects, features and advantages of the present disclosure will become more apparent in light of the following detailed description of best mode embodiments thereof, as illustrated in the accompanying drawings.

BRIEF DESCRIPTION OF DRAWINGS

FIGS. 6A and 6B are each a diagram showing a display example of a display apparatus at the time of selecting a menu screen;

FIG. 14 is a diagram showing a configuration example of a message database;

FIG. 18 is a diagram showing an example of combining video of users;

DETAILED DESCRIPTION OF EMBODIMENTS

Hereinafter, an embodiment of the present disclosure will be described with reference to the drawings.

<Configuration of Display Apparatus>

(Appearance of Display Apparatus)

Figure 1:
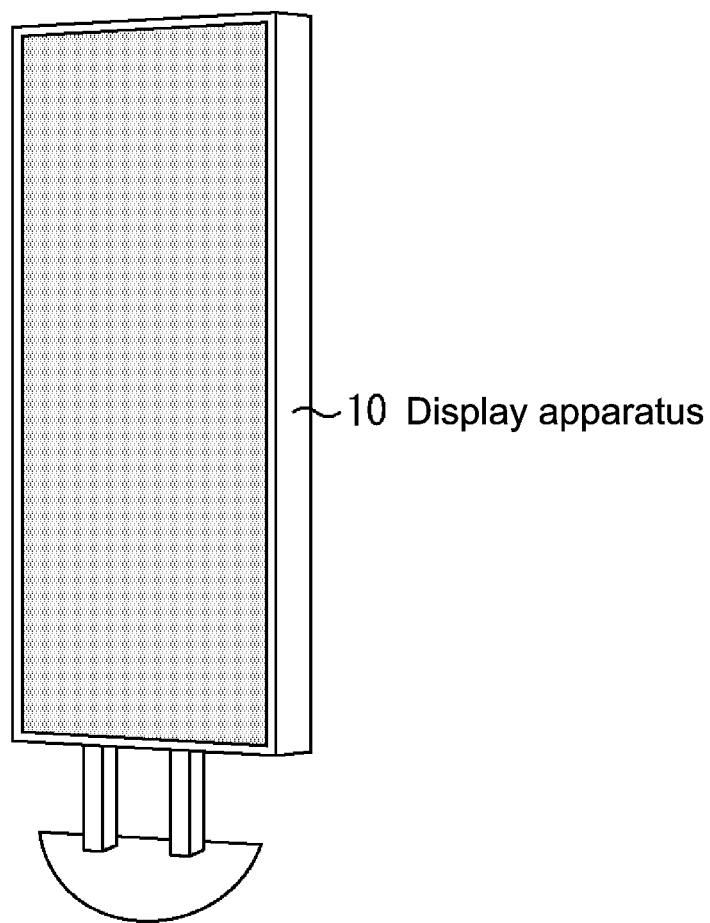
FIG. 1 is a diagram showing the appearance of a display apparatus to which an embodiment of the present disclosure is applied.

FIG. 1 is a diagram showing the appearance of a display apparatus to which an embodiment of the present disclosure is applied;

As shown in FIG. 1, a display apparatus 10 includes a plate-like casing having a large screen, and is assumed to be set so that the large screen is vertical, or to be hung over a wall as a main usage pattern.

The display apparatus 10 includes a camera unit and a microphone in addition to a touch panel in which a touch sensor and a display unit are integrated. Accordingly, the display apparatus 10 is capable of registering (recording) a video message of a user to a different user in accordance with a user's operation of the touch panel, and the different user can reproduce the registered video message.

(Internal Configuration of Display Apparatus)

Figure 2:
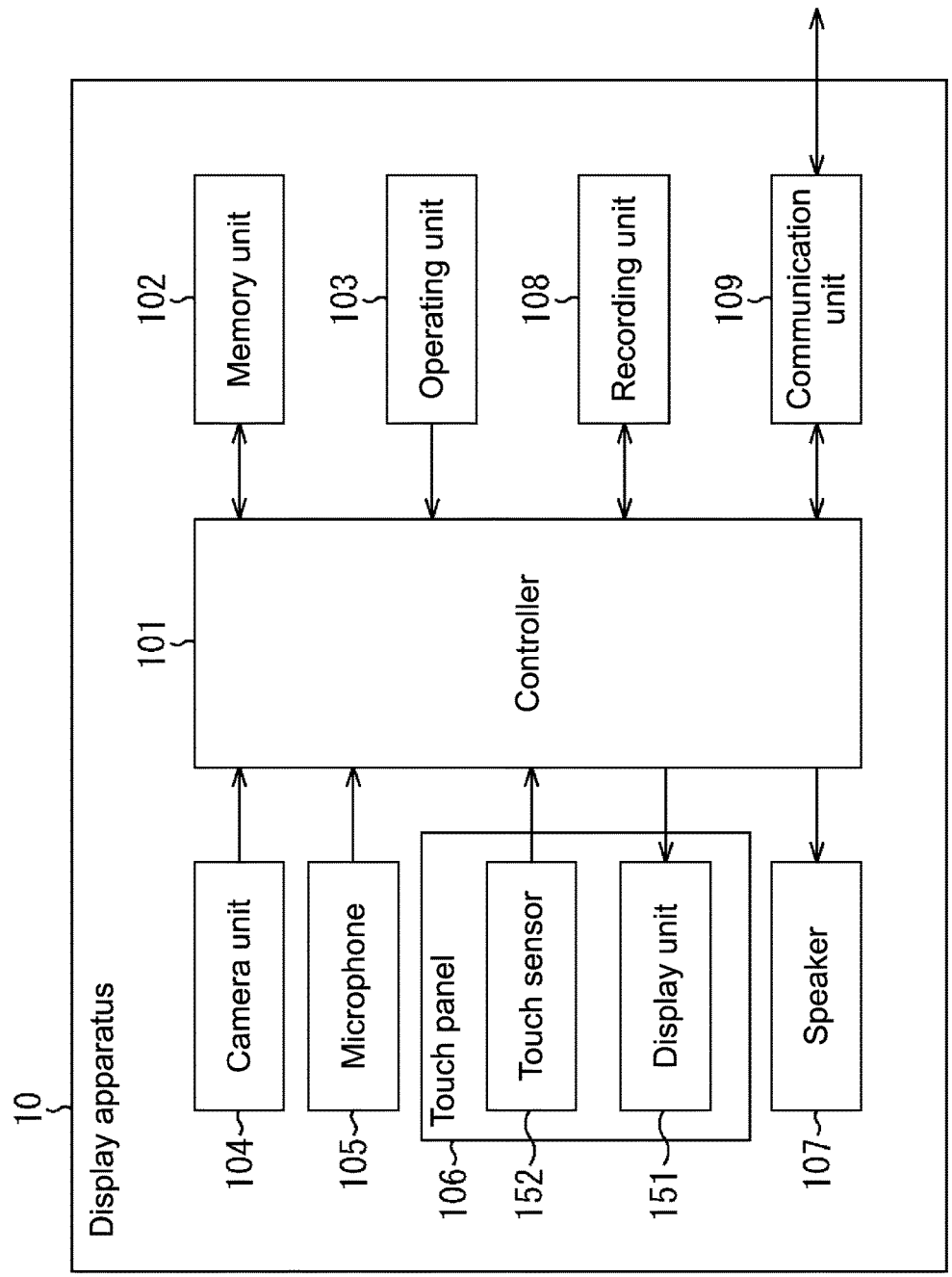
FIG. 2 is a diagram showing the internal configuration of the display apparatus to which the embodiment of the present disclosure is applied.

FIG. 2 is a diagram showing the internal configuration of the display apparatus to which the embodiment of the present disclosure is applied.

As shown in FIG. 2, the display apparatus 10 shown in FIG. 1 includes a controller 101, a memory unit 102, an operating unit 103, a camera unit 104, a microphone 105, a touch panel 106, a speaker 107, a recording unit 108, and a communication unit 109.

The controller 101 controls the operation of the respective units of the display apparatus 10. The memory unit 102 temporarily stores various types of data under control of the controller 101.

The operating unit 103 is a button or the like provided on the display apparatus 10 and supplies an operation signal corresponding to a user's operation to the controller 101. The controller 101 controls the operation of the respective units based on the operation signals from the operating unit 103.

The camera unit 104 photographs a subject under control of the controller 101. The camera unit 104 supplies video data obtained by the photographing to the controller 101. The microphone 105 converts audio from the outside into audio data, and supplies the audio data to the controller 101 under control of the controller 101. The controller 101 associates the video data from the camera unit 104 with the audio data from the microphone 105, and records them as a video message in the recording unit 108. It should be noted that although the details are not described here, the video message is compressed in accordance with a predetermined compression format and is recorded as a file, for example.

The touch panel 106 includes a display unit 151 and a touch sensor 152 superimposed on a screen of the display unit 151. The display unit 151 includes a liquid crystal display (LCD) or the like and displays various types of information under control of the controller 101. Further, the touch sensor 152 detects an input operation made with respect to the touch panel 106 by the user 1 along with a position at which the operation has been made on the touch panel 106 and supplies the detection signal to the controller 101. The controller 101 controls the operation of the respective units depending on the detection signal from the touch sensor 152.

It should be noted that various detection methods such as a capacitance method and an electromagnetic induction method can be adopted for the touch panel 106.

The speaker 107 converts the audio data into audio and outputs the audio to the outside under control of the controller 101. The recording unit 108 includes an HDD (Hard Disk Drive), for example. The recording unit 108 records various types of data under control of the controller 101.

The communication unit 109 communicates with other electronic apparatuses and various servers (not shown) via a network under control of the controller 101.

The display apparatus 10 is configured as described above.

(Functional Configuration Example of Controller)

Figure 3:
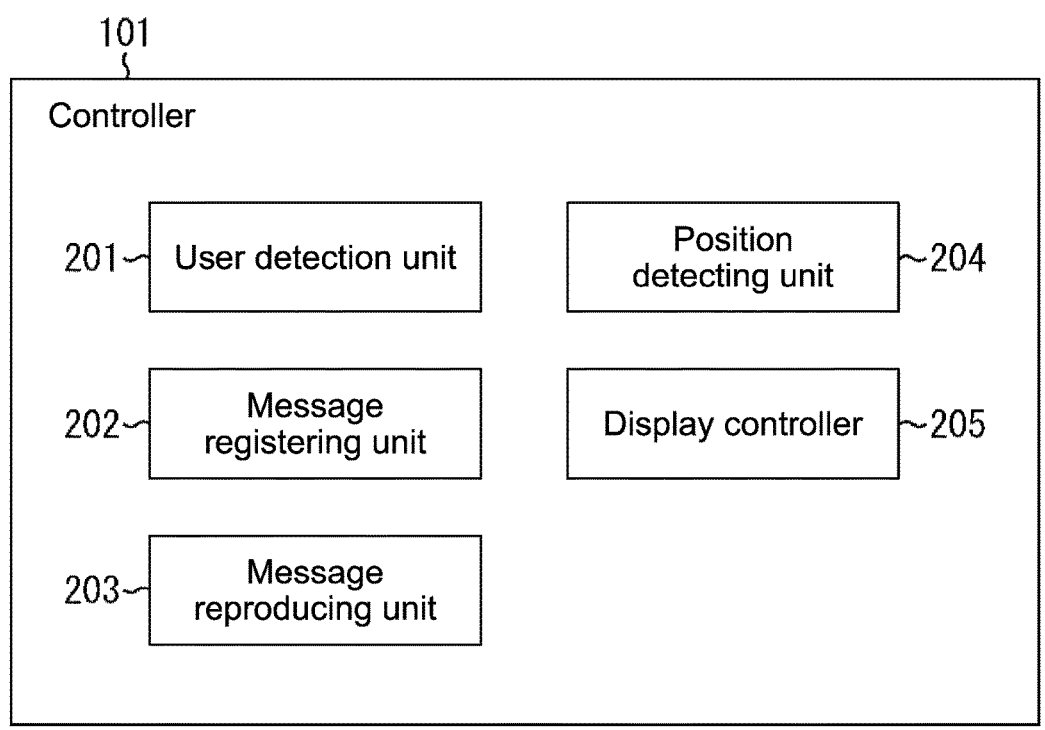
FIG. 3 is a diagram showing a functional configuration example of a controller.

FIG. 3 is a diagram showing a functional configuration example of the controller 101 shown in FIG. 2.

As shown in FIG. 3, the controller 101 includes a user detection unit 201, a message registering unit 202, a message reproducing unit 203, a position detecting unit 204, and a display controller 205.

The user detection unit 201 applies predetermined image processing to the video data from the camera unit 104 to detect a user in the vicinity of the front of the display apparatus 10. The user detection unit 201 supplies the user detection results to the display controller 205 or the like.

To the message registering unit 202, the video data from the camera unit 104 and the audio data from the microphone are supplied at the time of registering a video message. The message registering unit 202 registers a video message including the video data and the audio data in a message database 232 (FIG. 4) in the recording unit 108.

Figure 4:
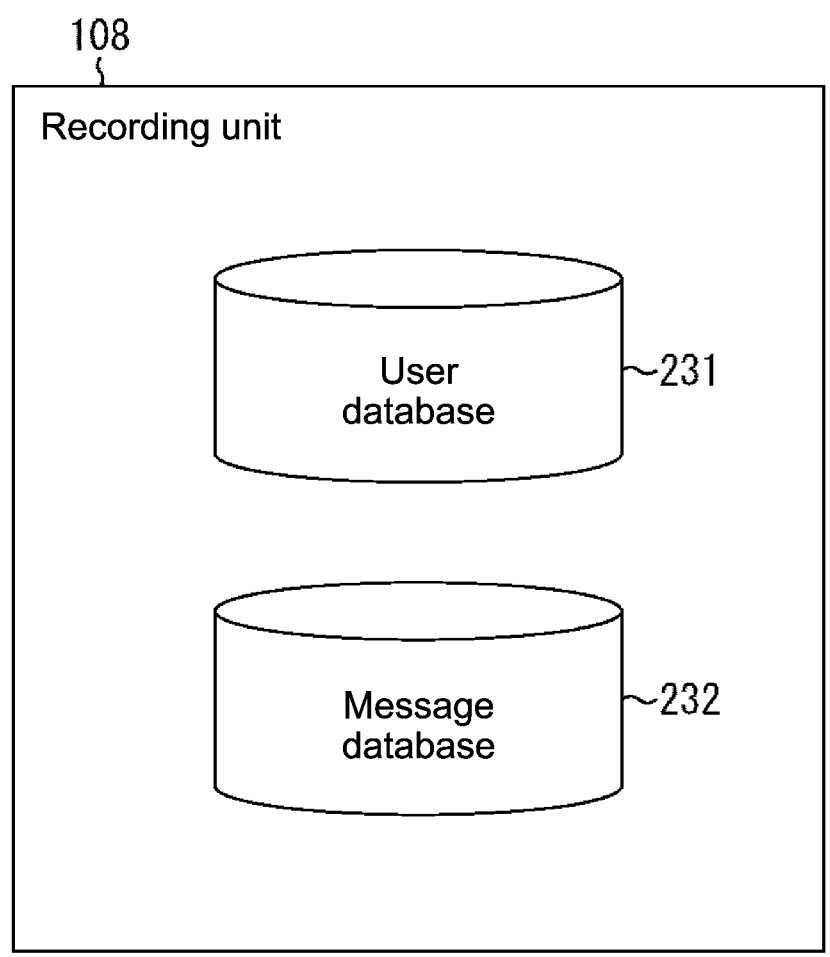
FIG. 4 is a diagram showing the details of a recording unit.

It should be noted that as shown in FIG. 4, the recording unit 108 includes a user database 231 and the message database 232. The user database 231 stores user information on each user. Therefore, by using the user information stored in the user database 231, a video massage of a user to another user can be registered (recorded) in the message database 232. It should be noted that the user database 231 stores user information such as a user name and an image of a user's face, for example. Moreover, the message database 232 stores, for example, a source, a destination, a transmission time and date, and information on a user's position in addition to a video message.

Now, FIG. 3 is described again. The message reproducing unit 203 reads a video message with reference to the message database 232 in the recording unit 108 at the time of reproducing a video message. The message reproducing unit 203 supplies the video data and the audio data which constitute a video message to the display unit 151 and the speaker 107, respectively. Accordingly, a video message of a user to another user is reproduced.

The position detecting unit 204 detects a three-dimensional position of a user in space by applying predetermined image processing to the video data from the camera unit 104, and associates the detected position with a user to be detected to store them in the message database 232. It should be noted that the method of detecting the three-dimensional position is not limited to the method using image processing, and may be another detection method such as a method of using a sensor for position detection.

The display controller 205 causes the display unit 151 to display various screens. For example, the display controller 205 causes the display unit 151 to display a menu screen in accordance with the user detection results obtained from the user detection unit 201.

The controller 101 is configured as described above.

<Specific Usage Example>

Next, how to use the display apparatus 10 will be described. Here, as a specific usage example, a situation in which users who are not on the scene exchange video messages via the display apparatus 10 will be described. In this example, it is assumed that the display apparatus 10 is set in a living room in a house and the family members living in the house exchange video messages in the house, in order to give a simple description. It should be noted that this family has five members, i.e., father, mother, and three children (two sons and one daughter).

(Message Transmitting/Receiving Processing)

With reference to the flowchart of FIG. 5, the message transmitting/receiving processing performed by the display apparatus 10 will be described first.

In Step S11, whether or not the activation of the display apparatus 10 is instructed is determined. In the case where the activation of the display apparatus 10 is instructed, the process proceeds to Step S12.

In Step S12, the user detection unit 201 performs user detection processing. In the user detection processing, predetermined image processing is applied to the video data from the camera unit 104, and a subject (user) in the video is detected in the case where the user is in the vicinity of the front of the display apparatus 10.

It should be noted that it is possible to continue to recognize the targeted user by storing data on the face image of the detected user in the memory unit 102 even if the user is framed out by coming close to the display apparatus 10 when the user operates the touch panel, for example. Moreover, the user detection unit 201 refers to the user database 231 to identify a user that corresponds to the face image of the detected user. Thus, user authentication is performed, and who is the detected user is recognized. Therefore, it is possible to perform processing depending on each user.

In Step S13, whether or not a user is detected in the user detection processing in Step S12 is determined. In the case where it is determined that a user is not detected in Step S13, the process returns to Step S12, and the processes of Steps S12 and S13 are repeated until a user is detected.

On the other hand, in the case where it is determined that a user is detected in Step S13, the process proceeds to Step S14. In Step S14, the display controller 205 causes the display unit 151 to display the video of the detected user and a menu screen.

FIGS. 6A and 6B are each a diagram showing a display example of the display apparatus 10 from when a user is detected to when the menu screen is displayed. FIG. 6A shows the display state before a user is detected. Before a user is detected, the video of the living room with nobody is displayed. It should be noted that the video before a user is detected is displayed in a blurred state.

After that, in the case where the father enters the living room and stands at the front of the display apparatus 10, for example, the father is detected as a user and the video of the father is displayed. FIG. 6B shows the display state after a user is detected. It should be noted that at this time, areas other than the area in the vicinity of the face of the father may be displayed in a blurred state. Moreover, the video of the father is displayed with a menu screen 251 being superimposed thereon. On the menu screen 251, a transmitting icon 252, a receiving icon 253, and a replying icon 254 are displayed. The transmitting icon 252 is selected when a new video message is transmitted, the receiving icon 253 is selected when a video message from a different user is received, and the replying icon 254 is selected when the video message from the different user is replied.

Now, the flowchart of FIG. 5 is described again. In Step S15, whether or not the transmission of a message is selected from the menu screen is determined. In the case where, for example, the transmitting icon 252 is operated on the touch panel in the menu screen 251 and it is determined that the transmission of a message is selected in Step S15, the process proceeds to Step S16.

In Step S16, the message registering unit 202 performs the message transmitting processing. In the message transmitting processing, in the case where the father is detected as a user, for example, a new video message from the father to the daughter is registered (recorded). The video message is registered in the message database 232. It should be noted that the details of the message transmitting processing will be described later with reference to the flowchart of FIG. 7.

When the message transmitting processing is completed, the process proceeds to Step S20.

In the case where it is determined that the transmission of a message is not selected in Step S15, the process proceeds to Step S17. In Step S17, whether or not the reception of a video message is selected from the menu screen is determined. In Step S17, in the case where the receiving icon 253 is operated on the touch panel in the menu screen 251, for example, and it is determined that the reception of a message is selected, the process proceeds to Step S18.

In Step S18, the message reproducing unit 203 performs the message receiving processing. In the message receiving processing, in the case where the father is detected as a user, for example, the video message from the daughter to the father, which has been recorded in advance, is read from the message database 232 and is reproduced. It should be noted that the details of the message receiving processing will be described with reference to the flowchart of FIG. 9.

When the message receiving processing is completed, the process proceeds to Step S20.

In the case where the replying icon 254 is operated on the touch panel in the menu screen in Step S17, for example, and it is determined that the reception of a video message is not selected, the process proceeds to Step S19.

In Step S19, the message registering unit 202 performs the message replying processing. In the message replying processing, in the case where the father, who has watched the video message from the daughter, is detected as a user, for example, a reply video message from the father to the daughter is registered (recorded).

The reply video message is registered in the message database 232. It should be noted that the details of the message replying processing will be described later with reference to the flowchart of FIG. 11.

It should be noted that the replying icon 254 may be displayed when the reproduction of the video message is completed in the message receiving processing in Step S18. In this case, when the replying icon 254 is operated on the touch panel and the message replying processing is performed, a reply video message to the most recently reproduced video message is registered.

When the message replying processing is completed, the process proceeds to Step S20.

In Step S20, whether or not another operation to the video message is performed by the user is determined. In the case where it is determined that another operation is performed in Step S20, the process returns to Step S14 and the process of Step S14 and subsequent processes are repeated. On the other hand, it is determined that another operation is not performed in Step S20, the process proceeds to Step S21.

In Step S21, whether or not the deactivation of the display apparatus 10 is instructed is determined. In the case where it is determined that the deactivation of the display apparatus 10 is not instructed in Step S21, the process returns to Step S12 and the process of Step S12 and subsequent processes are repeated. Then, in the case where the deactivation of the display apparatus 10 is instructed in Step S21, the message transmitting/receiving processing shown in FIG. 5 is ended.

This is the end of the description of the message transmitting/receiving processing.

(Message Transmitting Processing)

Figure 7:
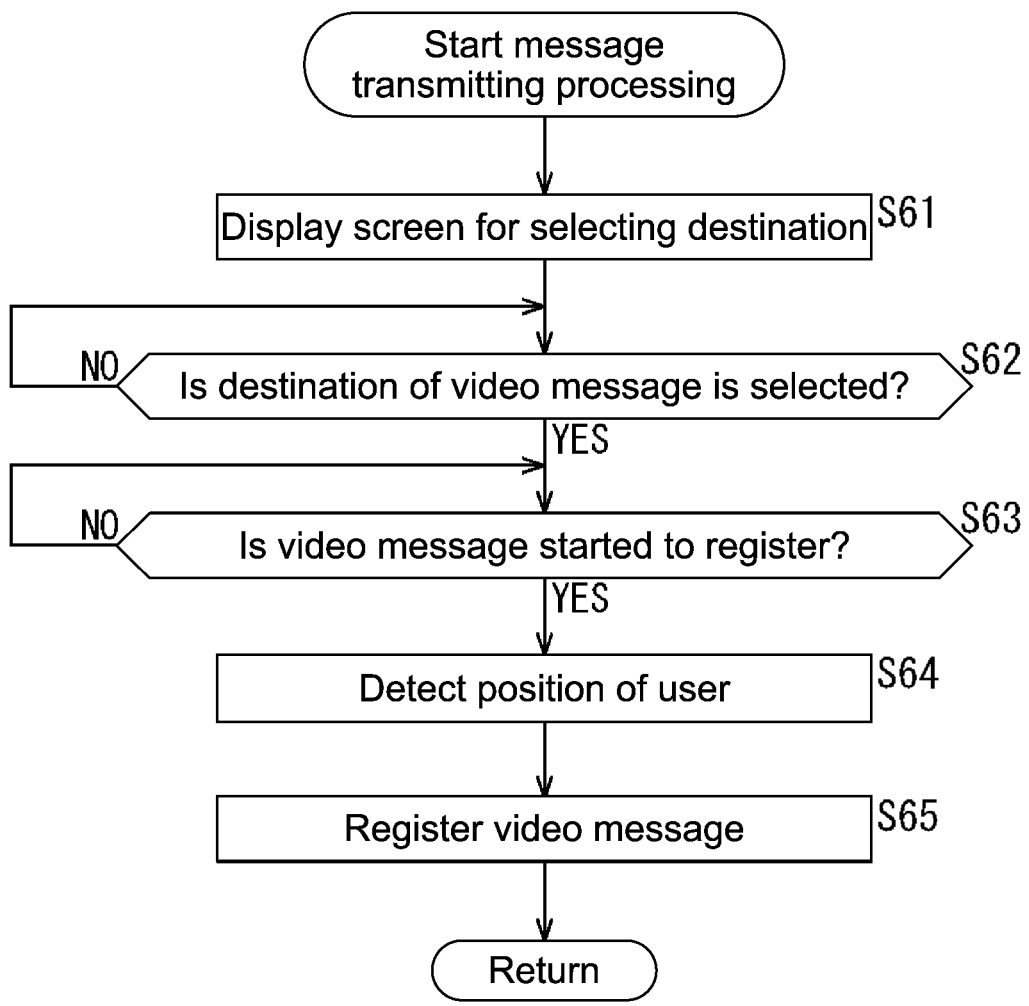
FIG. 7 is a flowchart for explaining the details of the message transmitting processing.

Next, with reference to the flowchart of FIG. 7, the details of the message transmitting processing that corresponds to Step S16 of FIG. 5 will be described.

In Step S61, the display controller 205 refers to the user database 231 and causes the display unit 151 to display a screen for selecting a destination (destination: another user) of a video message. Accordingly, the user can select a desired destination from the screen for selecting a destination by an operation on the touch panel.

In Step S62, whether or not a destination of a video message is selected by a user's operation on the touch panel is determined. When the destination of a video message is selected, the process proceeds to Step S63.

In Step S63, whether or not a video message is started to be registered is determined. In the case where it is determined that the video message is started to be registered in Step S63, the process proceeds to Step S64.

In Step S64, the position detecting unit 204 detects a three-dimensional position of a user in space by applying predetermined image processing to video data, for example, and registers the detected position in the message database 232.

In Step S65, the message registering unit 202 registers the video data from the camera unit 104 and the audio data from the microphone 105 as a video message in the message database 232.

Accordingly, a video message from a user to a different user is registered (recorded), and the different user can reproduce the video message. In other words, a video message is transmitted from a user to a different user.

Figure 5:
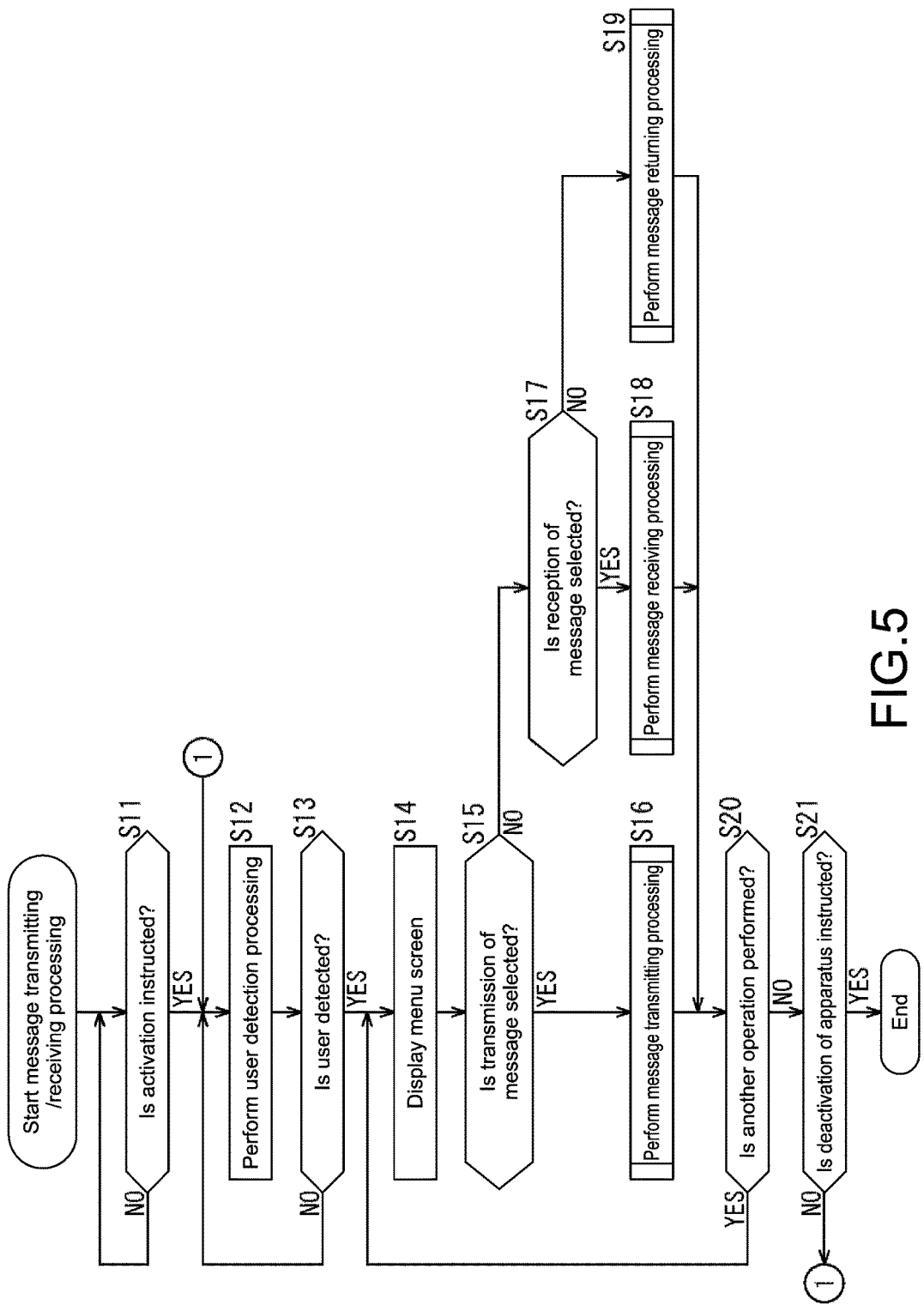
FIG. 5 is a flowchart for explaining message transmitting/receiving processing.

When the registration of a video message is completed, the process returns to Step S16 of FIG. 5, and the process of Step S16 and subsequent processes are performed.

Figure 8:
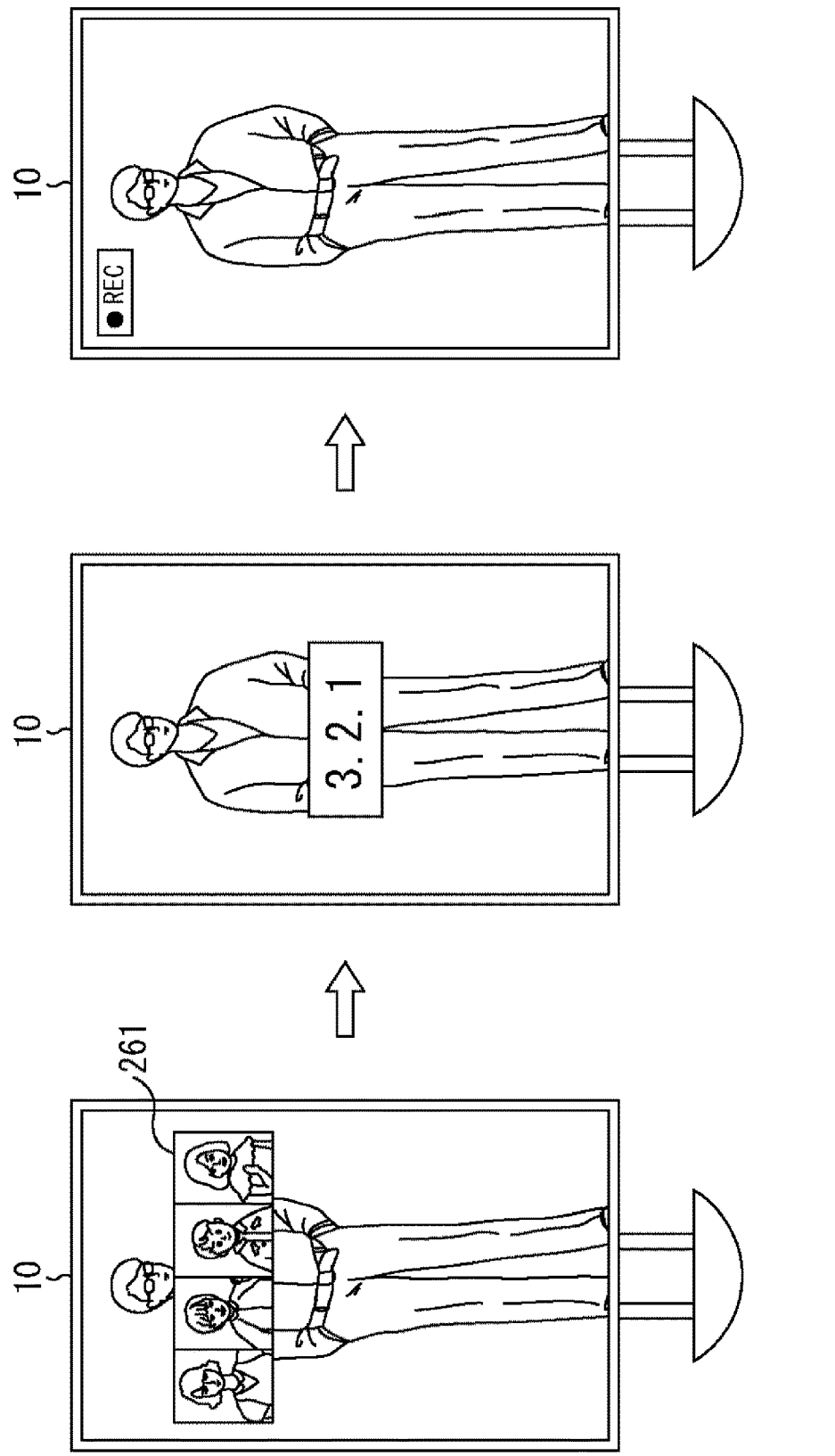
FIGS. 8A, 8B, and 8C are each a diagram showing a display example of the display apparatus at the time of transmitting a video message.

FIGS. 8A, 8B, and 8C are each a diagram showing a display example of the display apparatus 10 at the time of transmitting a video message.

As shown in FIG. 8A, a screen 261 for selecting a destination, which is superimposed on the video of the father, who stands at the front of the display apparatus 10, is displayed when the transmitting icon 252 is selected from the menu screen 251. Here, by registering user information on the family members in the user database 231 in advance, face images of the mother and children except the father, who is identified by user authentication, are displayed on the selection screen 261. Then, when the face image of the daughter is selected from the selection screen 261 by a father's operation on the touch panel, the daughter is selected as a destination of the video message.

Since the face image of a user who is a destination of a video message is displayed as described above, a user who registers a video message can select a destination intuitively. Moreover, although an example in which only one destination is selected is described here, a plurality of destinations may be selected, e.g., the family members except himself/herself are selected as destinations.

When a destination is selected, as shown in FIG. 8B, for example, a predetermined count down is displayed before a video message is started to be registered. Accordingly, as shown in FIG. 8C, the video message is registered (recorded).

In the case where the father selects the daughter as a destination and transmits a video message, for example, the father stands at the front of the display apparatus 10 and speaks to the daughter, who is not in the space (living room) at the same time, with gestures. Thus, the video message to the daughter is recorded. As a result, in addition to the video message to the daughter, information on a source (father), a destination (daughter), a transmission time and date, and a position of the user (position at which the father stands) is stored in the message database 232, for example.

This is the end of the description of the message transmitting processing.

(Message Receiving Processing)

Figure 9:
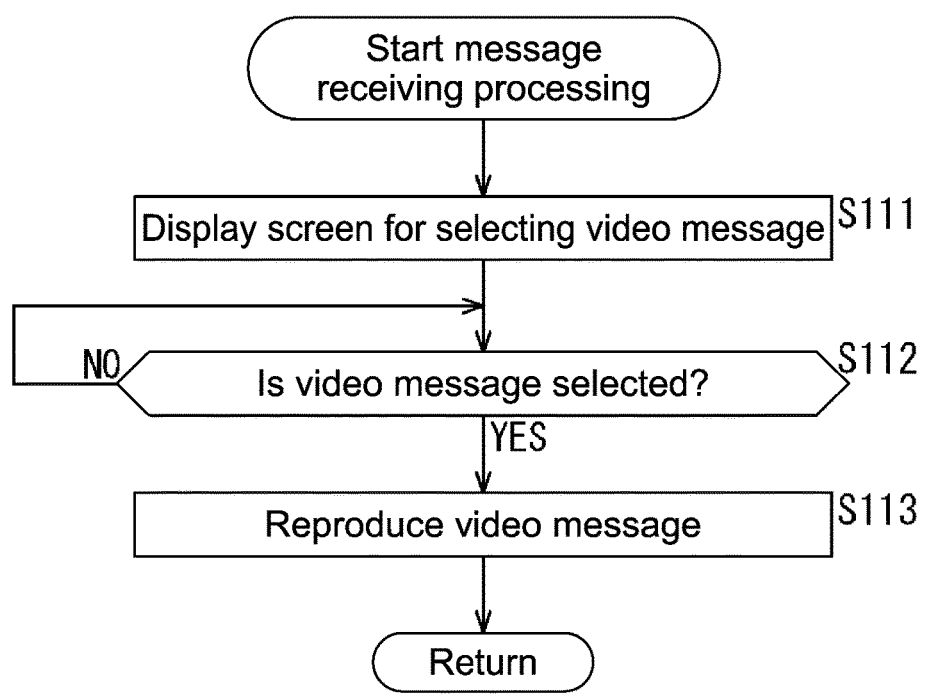
FIG. 9 is a flowchart for explaining the details of the message receiving processing.

Next, with reference to the flowchart of FIG. 9, the details of the message receiving processing that corresponds to Step S18 of FIG. 5 will be described.

In Step S111, the display controller 205 refers to the message database 232 and causes the display unit 151 to display a screen for selecting a video message whose destination (address) is the user.

In Step S112, whether or not a video message being a reproduction target is selected by a user's operation of the touch panel is determined. When a video message being a reproduction target is selected, the process proceeds to Step S113.

In Step S113, the message reproducing unit 203 refers to the message database 232 and reproduces the video message being a reproduction target.

Accordingly, a user can reproduce a video message registered (recorded) by a different user. In other words, a user receives a video message from a different user.

When the reproduction of a video message is completed, the process returns to Step S18 of FIG. 5 and the process of Step S18 and subsequent processes are performed.

Figure 10:
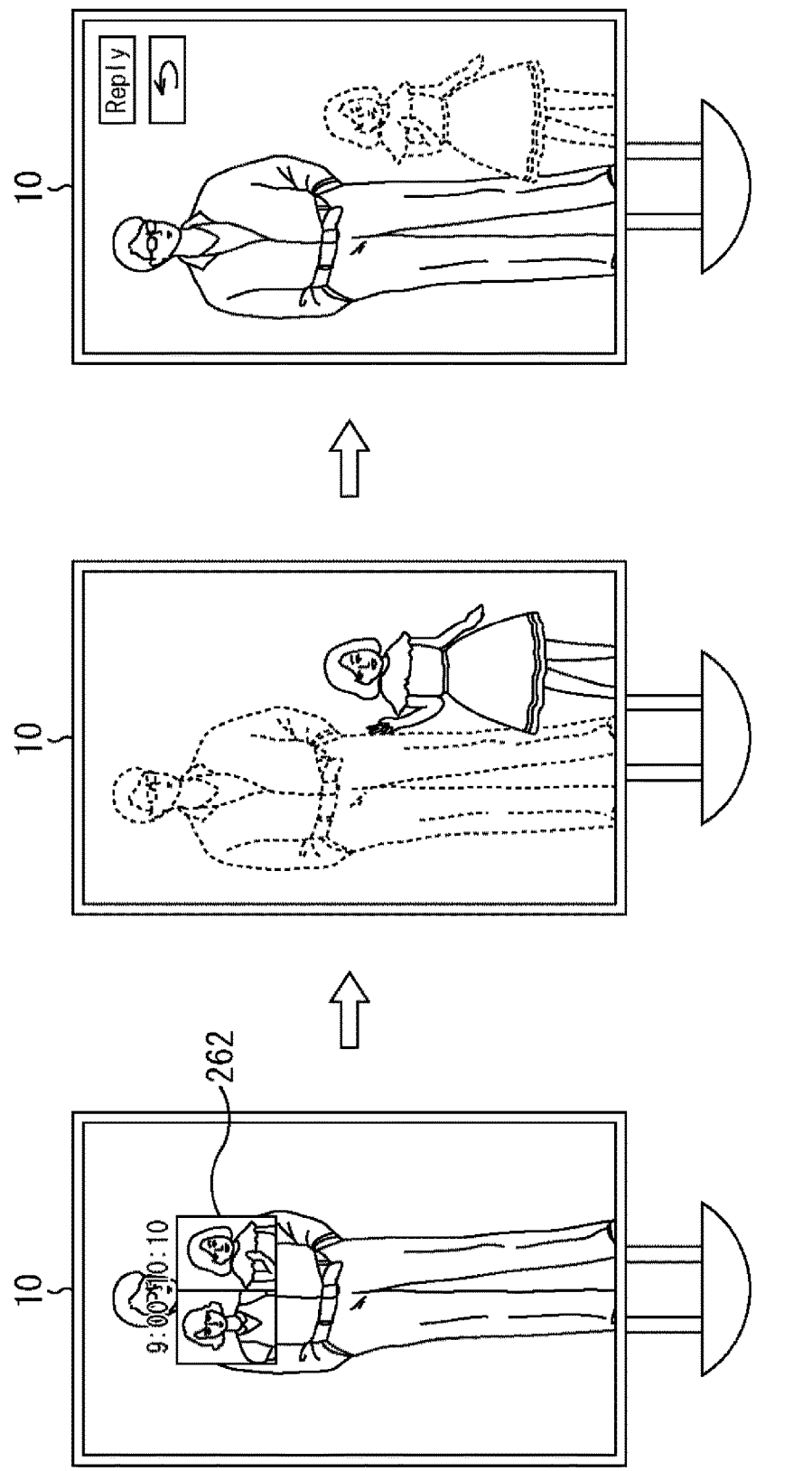
FIGS. 10A, 10B, and 10C are each a diagram showing a display example of the display apparatus at the time of receiving a video message.

FIGS. 10A, 10B, and 10C are each a diagram showing a display example of the display apparatus 10 at the time of receiving a video message.

As shown in FIG. 10A, a screen 262 for selecting a video message, which is superimposed on the video of the father, who stands at the front of the display apparatus 10, is displayed when the receiving icon 253 is selected from the menu screen 251. Here, on the selection screen 262, face images of family members, who have transmitted video messages to the father, and transmission time and dates of the video messages are displayed. For example, in the case where the mother and the daughter have transmitted video messages to the father at 9:00 and 10:10, respectively, face images of the mother and daughter together with the transmission time and dates are displayed on the selection screen 262. Then, when the face image of the daughter is selected by a father's operation on the touch panel, for example, the video message from the daughter is selected.

Since a face image of a source of a video message is displayed as described above, a user who reproduces a video message can select a message intuitively.

When a face image is selected, a video message is started to be reproduced. For example, as shown in FIG. 10B, the video of the daughter is displayed when the video massage from the daughter is reproduced. Moreover, it is possible to superimpose the live video of the father on the recorded image of the daughter and to display the superimposed video. At this time, it is possible to emphasize the video of the daughter, who is a source of the video message, by adjusting the transparency of the video of the father so that the video of the father is semi-transparent, and to display the emphasized video.

When the reproduction of a video message is completed, the video of the father whose transparency is adjusted returns to the original state and the live video of the father is displayed, as shown in FIG. 10C. On the other hand, by adjusting the transparency of the video of the daughter, which has been reproduced as a video message, so that the video of the daughter is semi-transparent, for example, it is possible to clearly indicate that the reproduction is completed. Moreover, in the case where the reproduction is completed, an icon that instructs a replay may be displayed. Accordingly, in the case where the icon is operated on the touch panel, the video message from the daughter can be reproduced again. Furthermore, a reply icon may be displayed when the reproduction is completed. In the case where the reply icon is operated on the touch panel, a reply video message from the father to the most recently reproduced video message from the daughter is registered.

It should be noted that the display pattern at the time of reproducing a video message described with reference to FIGS. 10A, 10B, and 10C is only an example, and another display pattern, e.g., undisplaying the live video of the father during the reproduction of the video message of the daughter, may be adopted.

This is the end of the description of the message receiving processing.

(Message Replying Processing)

Figure 11:
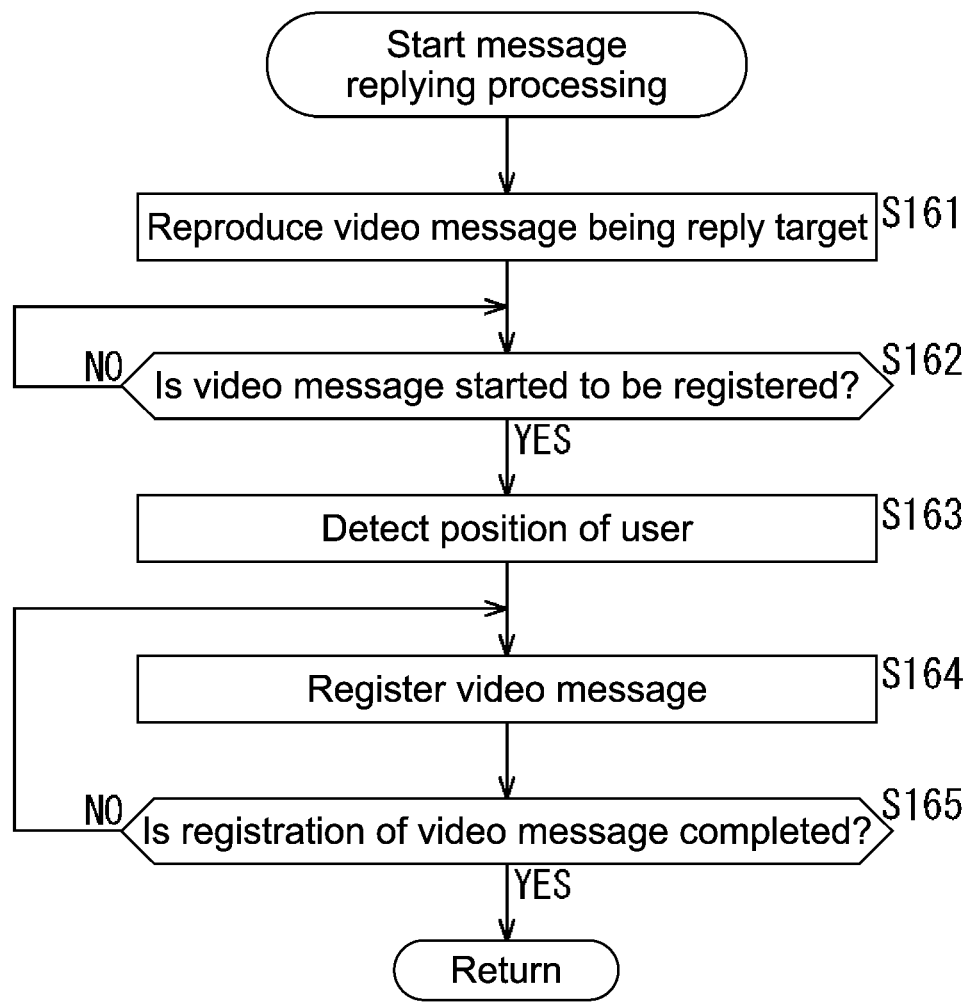
FIG. 11 is a flowchart for explaining the details of message returning processing.

Next, with reference to the flowchart of FIG. 11, the details of the message replying processing that corresponds to Step S19 of FIG. 5 will be described.

In Step S161, the message reproducing unit 203 refers to the message database 232 and reproduces a video message being a reply target. It should be noted that the reply of a video message is performed by a user who has reproduced the video message to a different user being a source of the video message. Therefore, the video message being a reply target is a video message being a reproduction target in Step S113 of FIG. 9.

In Step S162, whether or not a video message is started to be registered is determined. In the case where it is determined that a video message is started to be registered in Step S162, the process proceeds to Step S163.

In Step S163, the position detecting unit 204 detects a three-dimensional position of a user in space by applying predetermined image processing to video data, for example, and registers the detected position in the message database 232.

In Step S164, the message registering unit 202 registers the video data from the camera unit 104 and the audio data from the microphone 105 in the message database 232 as a video message.

In Step S165, whether or not the registration of a video message is completed is determined. In the case where it is determined that the registration of a video message is not completed in Step S165, the process proceeds to Step S164, and the process of Step S164 and subsequent processes are repeated. Specifically, in this case, a reply video message is registered while a video message being a reply target is reproduced and is displayed on the display unit 151.

When the registration of a reply video message is completed, the process returns to Step S19 of FIG. 5, and the process of Step S19 and subsequent processes are performed.

Figure 12:
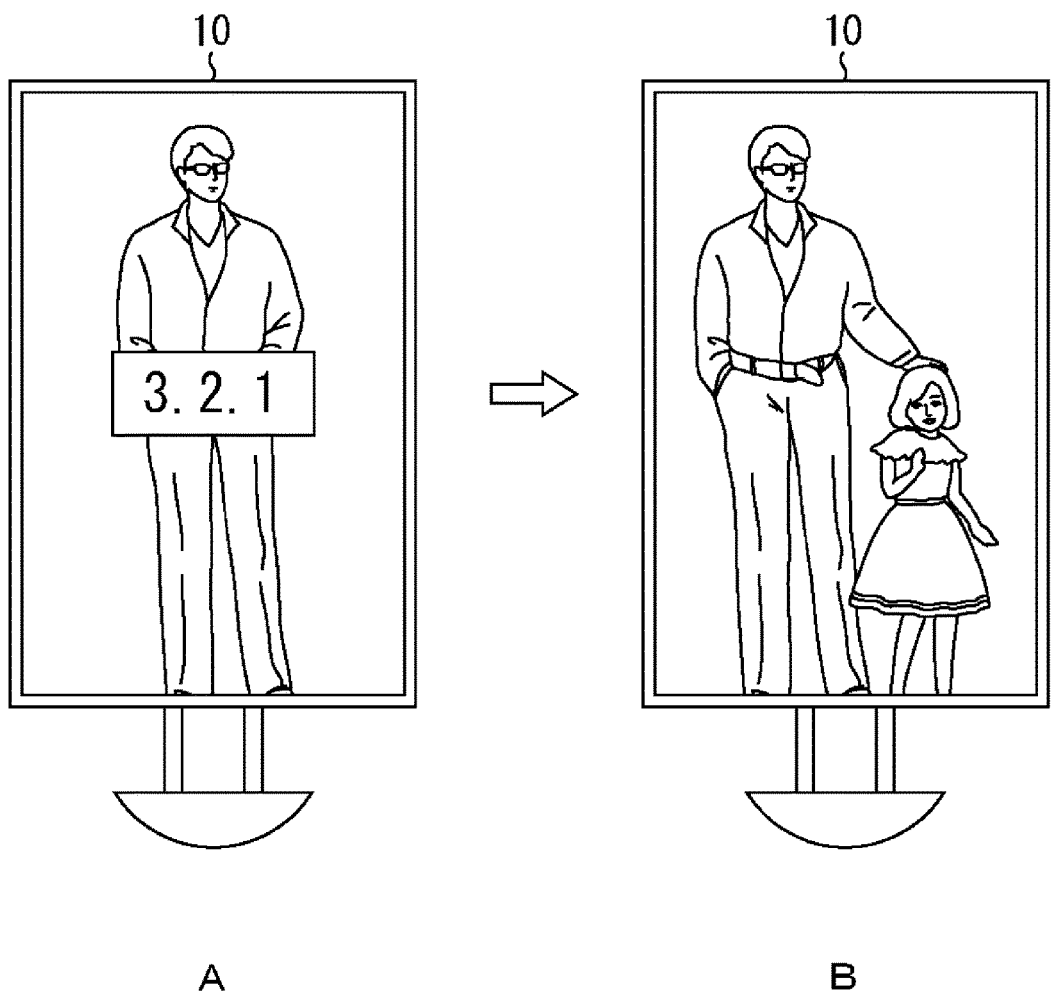
FIGS. 12A and 12B are each a diagram showing a display example of the display apparatus at the time of returning a video message.

FIGS. 12A and 12B are each a diagram showing a display example of the display apparatus 10 at the time of replying a video message.

When the replying icon 254 displayed on the menu screen 251 or a reply icon displayed when the reproduction is completed is selected, a predetermined countdown is displayed as shown in FIG. 12A. After that, a reply video message is started to be registered. Accordingly, as shown in FIG. 12B, a reply video message is registered (recorded).

For example, in the case where the father replies the video message from the daughter, the live video of the father is displayed while the video message from the daughter is reproduced. Accordingly, the father can make gestures depending on the video of the daughter while watching the video of the daughter. Specifically, in the example shown in FIG. 12B, the live video of the father, who praises his daughter's school record while caressing his daughter's head, which is superimposed on the recorded video of the daughter, who reports the school record as a video message, is displayed. In other words, although the father and the daughter are not in the same space (living room) at the same time, composite video of the father and the daughter, which seems as if they are in the same space at the same time, is displayed and the composite video can be registered (recorded) as a video message.

Figure 13:
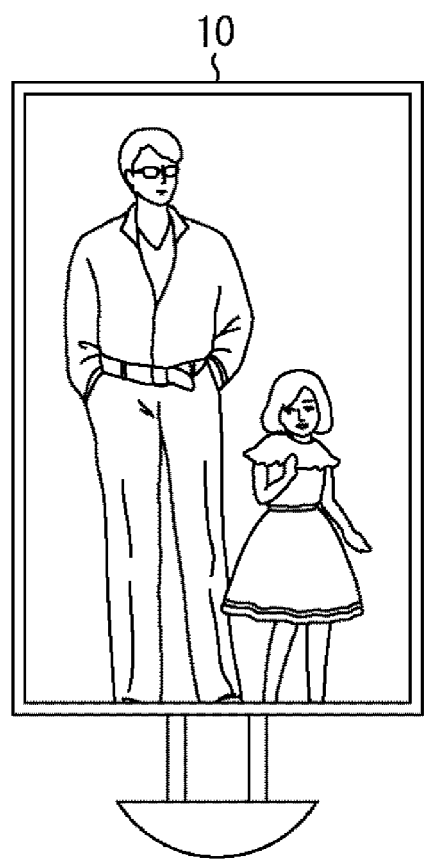
FIG. 13 is a diagram showing a display example of the display apparatus at the time of reproducing a return video message.

As described above, even if the daughter has gone to bed when the father comes home from work, for example, the father can see how his daughter is doing if the daughter has left a video message to the father. Moreover, the father can leave a video message to the daughter in which the father and the daughter are in the same space at the same time. Accordingly, as shown in FIG. 13, the daughter can reproduce the video message from the father and receive a reply from the father, who praises the daughter's school records, the next day. This is the end of the description of the message replying processing.

(Principle of Superimposing Video)

As described above, in the embodiment of the present disclosure, by superimposing video separately recorded by users who are not in the same space at the same time, composite video that seems as if the users are in the same place can be reproduced. Hereinafter, the principle of superimposing video according to the embodiment of the present disclosure will be described. Here, video messages shown in FIG. 14 are sequentially registered in the message database 232 in time series.

In the message database 232 shown in FIG. 14, a video message of "We have some ice cream in the fridge" to all of the family member is registered by a user A (mother) at a time t0 and a video message of "The ice cream was yummy" from users B and C (sons) to the user A (mother) is registered at a time t1. In addition, a video message of "Welcome back, daddy" from a user D (daughter) to a user M (father) is registered at a time t2. Then, a video message of "Thank you" from the user M (father) to the user D (daughter) is being registered at the current time (now).

In the example shown in FIG. 14, a video message is written by characters for the convenience of the description. However, video in which a source user speaks to a destination user, who is not on the scene, with gestures is registered actually.

Figure 15:
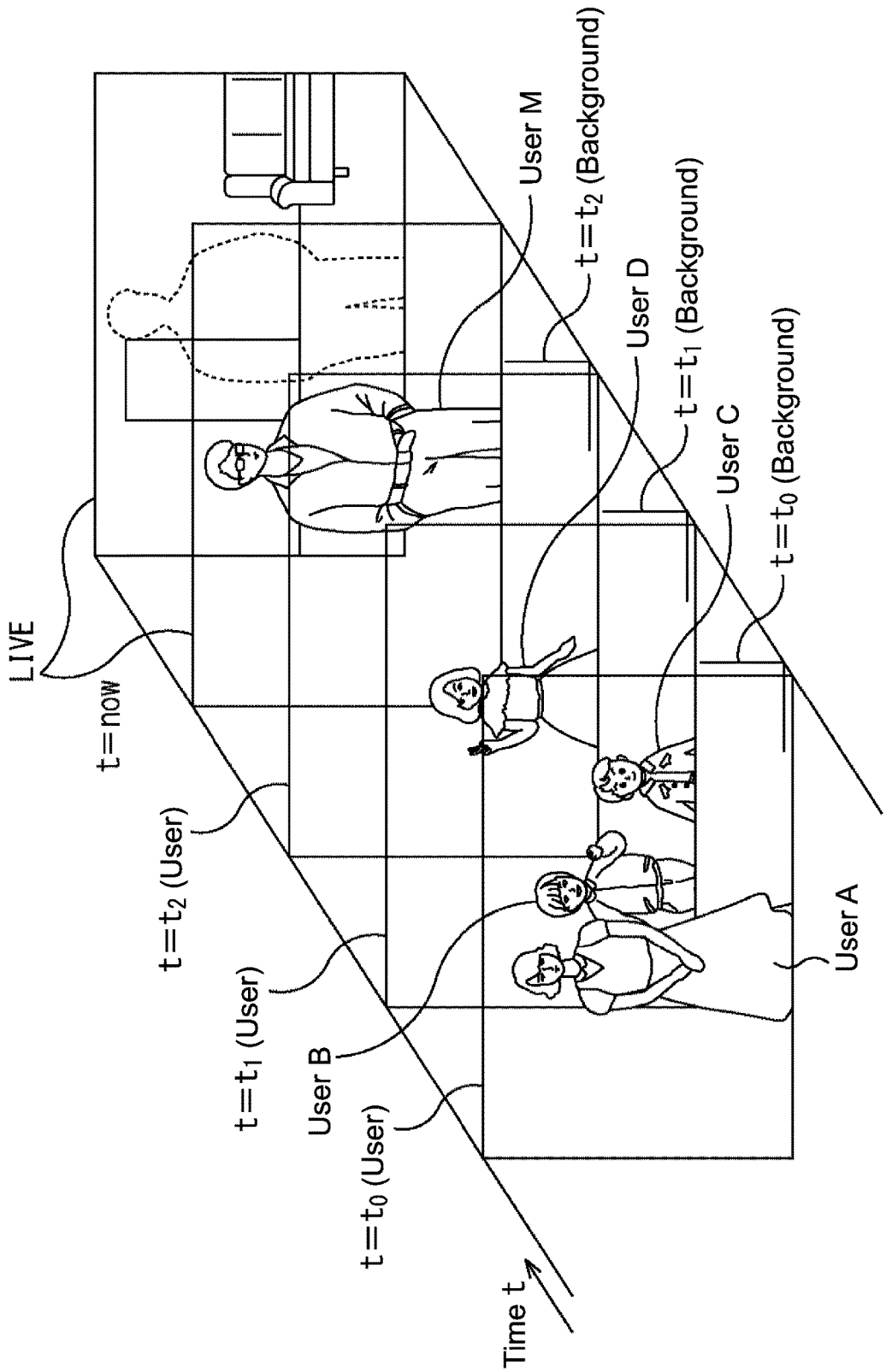
FIG. 15 is a diagram showing video messages arranged in time series.

Specifically, as shown in FIG. 15, a time axis is taken in the direction of an arrow of a time t and video messages registered in the message database 232 are arranged in time series, which represents that video massages of the user A (mother), the users B and C (sons), the user D (daughter), and the user M (father) have been registered in the stated order. It should be noted that in FIG. 15, only one frame of a plurality of frames constituting each video message is shown in time series.

Figure 16:
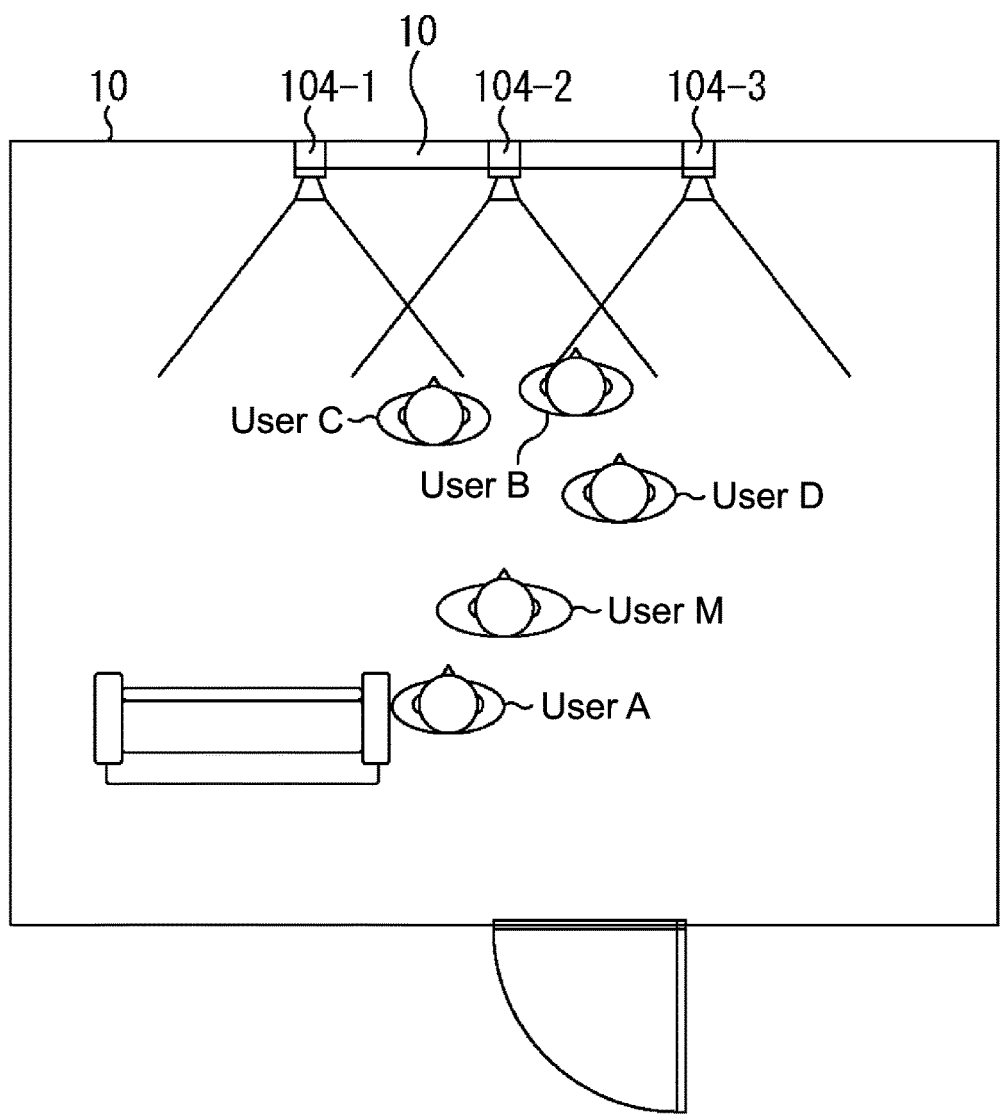
FIG. 16 is a diagram showing a user position in space.

It should be noted that as shown in FIG. 16, if users who have registered video messages are in the same space when the living room in which the display apparatus 10 is set is viewed from the above, the standing positions are different. Moreover, a video message registered in such a situation includes not only video of a user but also video of the background, and the background of each video message is basically the same. Then, it needs only one background when video is combined to generate composite video, and another background is unnecessary. In this regard, when a video message is registered, video of a user is separated from video of the background.

Specifically, as shown in FIG. 15, video at the time t0 in which video of the user A (mother) is separated from video of the background, video at the time t1 in which video of the users B and C (sons) is separated from video of the background, and video at the time t2 in which video of the user D (daughter) is separated from video of the background are registered. Accordingly, when composite video including all users is reproduced, composite video obtained by superimposing video of the mother, the sons, and the daughter, which is separated from video of the background, on the live video of the father including the background, is reproduced, for example.

Moreover, as the method of separating video of each user from video of the background and registering the video, the following method can be adopted, for example. Specifically, video of each user can be separated from video of the background by providing a plurality of camera units 104-1 to 104-3 in the display apparatus 10 and separating the background by the stereo vision using displacement caused between images taken by each camera unit 104. It should be noted that the method using stereo vision is only an example of the method of separating video of each user from video of the background. For example, it is possible to separate video of each user from video of the background by adopting a method of applying infrared ray to form a pattern, a background subtraction method, a method of using detection results obtained from various sensors such as a phase sensor, or the like. By using these methods, it is possible to separate image of each user from image of the background and register the image in real-time.

Figure 17:
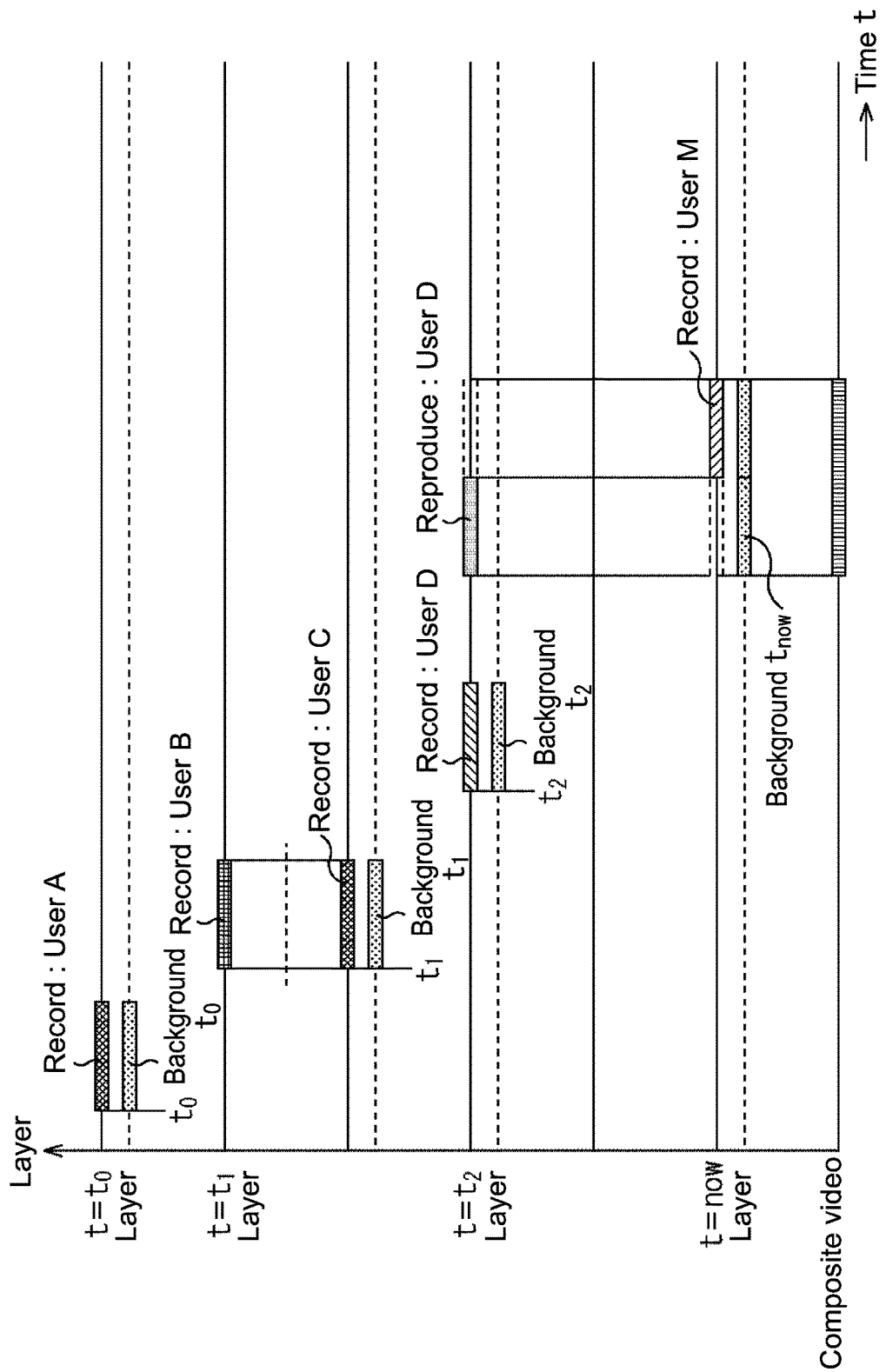
FIG. 17 is a timing chart showing video messages in time series.

FIG. 17 is a timing chart showing video messages registered in the message database 232 shown in FIG. 14 in time series. In FIG. 17, the horizontal direction represents a time axis and the vertical direction represents a layer when video is superimposed. As shown in the timing chart of FIG. 17, each video message in which video of a user is separated from video of the background is registered (recorded) in the message database 232. Moreover, when the user M (father) registers a reply video message at the current time (now), the video message from the user D (daughter) is reproduced and composite video is displayed. Only the recorded video of the user D (daughter) is superimposed on the live video of the father, because image of the background is separated.

Moreover, although not shown in FIG. 14, information on the position of each user, which represents the standing position of the user, is associated with each video message and is stored in the message database 232. Specifically, although the standing position of each user is different as shown in FIG. 16, the actual standing position of each user is detected as a three-dimensional position, thereby reflecting the detected position to the order of layers when video is superimposed.

In the example shown in FIG. 16, when the detected position of the user D (daughter) is compared with the detected position of the user M (father), the daughter is in front of the father with respect to the display apparatus 10. In this case, as shown in FIG. 18, a video message depending on the standing position of each user can be reproduced by superimposing video so that video of the daughter in the front is in front of video of the father. It should be noted that also by adjusting the transparency of video, e.g., displaying the video of the father behind the daughter in a light color, similar effects can be obtained.

Figure 19:
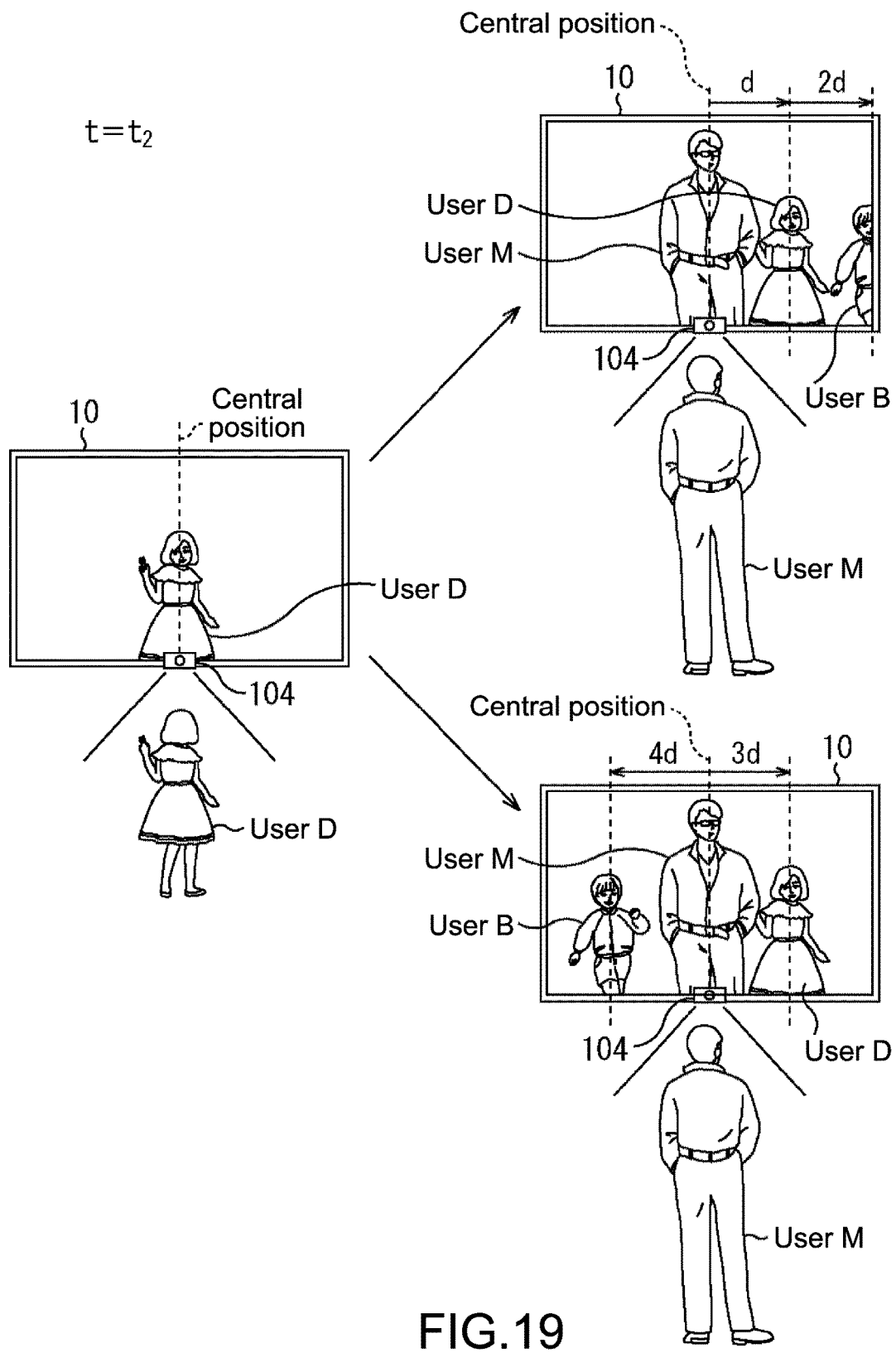
FIG. 19 is a diagram for explaining the adjustment of the display position of users.

Moreover, as shown in the left part of FIG. 19, in the case where each user registers a video message in front of the display apparatus 10, it is supposed to be hard to see the video because video of each user is superimposed when the video message is reproduced. In this case, the display position of each user can be adjusted so as not to superimpose the video of each user. For example, in the case where after the daughter stands at the center position in front of the display apparatus 10 and registers a video message to the father, the father stands at the center position similarly and registers a video message to the daughter, the display position of the video of the daughter is overlapped with the display position of the live video of the father.

In this case, the standing position of each user can be detected and the display position of the user can be displaced so as not to overlap the display position of each user. For example, as shown in the right upper part of FIG. 19, in the case where video messages of the daughter and the son have been registered, the video of the daughter can be displaced from the center position to the right direction of FIG. 19 by a distance d, and the video of the son can be displaced from the center position to the right direction by a distance $2d$ so as not to superimpose the live video of the father on the recorded video of the daughter and the son. It should be noted that in this case, the distance d and the distance $2d$ are set to predetermined distances defined in advance, for example.

Moreover, for example, as shown in the right lower part of FIG. 19, whether there is video of a user to be superimposed, which is included in registered video messages, may be determined before the display position is displaced. For example, in the case where the live video of the father is superimposed on the recorded video of the daughter and the son, the video of the daughter can be displaced from the center position to the right direction of FIG. 19 by a distance 3*d* and the video of the son is displaced to the left direction of FIG. 19 by a distance 4*d* so as not to overlap video of the three persons displayed at the same time. It should be noted that in this case the distance 3*d* and the distance 4*d* are set to distances such that video of each user is not overlapped, for example.

It should be noted that in the above description, the standing position of each user is detected and the order of superimposing video of the user is determined depending on the detected position. However, the order of superimposing video of the user may be determined depending on the registration time of a video message or user settings, for example. Specifically, in the case where the registration time of a video message is used, video of a user included in a video message whose registration time is new or old can be displayed in front of video of a user included in another video message, for example. For example, as shown in FIG. 15, in the case where video of a user is displayed in the front in order of a message whose registration time is old, video of the mother, the sons, the daughter, and the father is superimposed in the stated order.

Moreover, by user settings, either video of a user is superimposed in front of or behind video of an arbitrary user may be adjusted. In addition, in the case where the display position of a user is overlapped with the display position of a different user, the display positions of the users may be adjusted by user settings or predetermined image processing. Furthermore, depending on a user's operation, a video message being a superimposing target may be added or deleted. Accordingly, for example, it is possible to delete a video message of himself/herself that has been registered in the past.

It should be noted that because the display apparatus 10 is provided in the living room in this example, the users are in the same space. However, for example, by setting another display apparatus in other space having the same physical settings (e.g., the size of the room, and the height of the installation) and performing communications by the communication unit 109 through a network, users may exchange video messages with each other. Moreover, in the example shown in FIG. 16, the configuration in which the plurality of camera units 104 are provided is shown for the convenience of the description. However, only one camera unit 104 may be included depending on the method of separating video.

As described above, according to the present disclosure, users who are not on the scene can exchange messages via the display apparatus 10. For example, in the above-mentioned example, the father and the daughter can make interactive communication by exchanging video messages including composite video in which the father and the daughter are in the same place at the same time, even if the father and the daughter are not in the same space at the same time. Moreover, by generating such composite video, it is possible to produce effects as if the father and the daughter, who are not in the same placed at the same time, are in the same place, when the video message is reproduced.

Moreover, a user who uses the display apparatus 10 can register (record) a video message including composite video in which video of himself/herself is superimposed on video of another user without editing a registered video message.

(Description of Computer to which Present Disclosure is Applied)

The series of processes described above may be performed by hardware or software. For the software to perform the series of processes described above, a program in the software is installed on a computer. Herein, the computer includes a computer in a hardware specifically designed therefor, or a general-purpose personal computer that may perform various functions by installation of various programs, for example.

Figure 20:
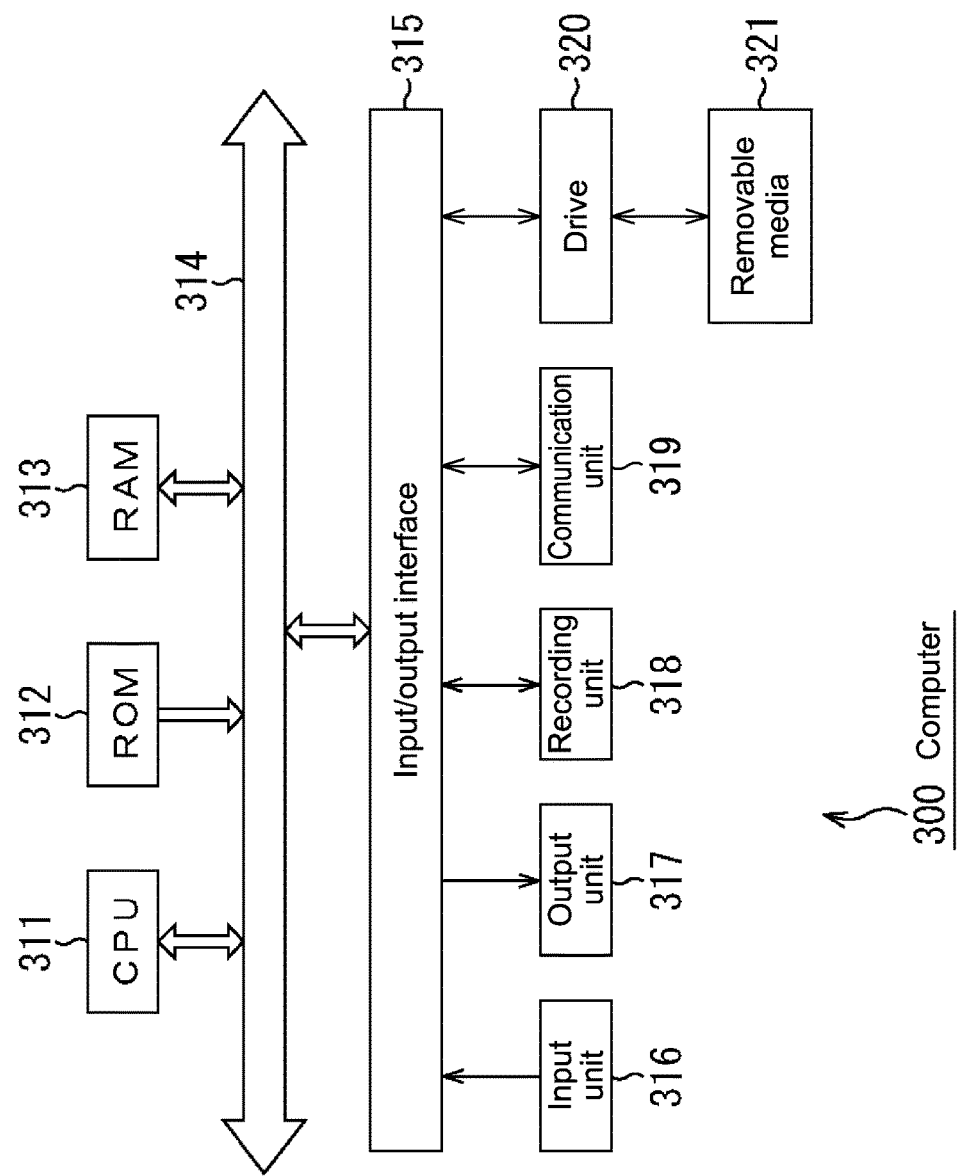
FIG. 20 is a diagram showing a configuration example of a computer.

FIG. 20 is a block diagram showing an exemplary hardware configuration of a computer that performs the series of processes described above by running a program.

In a computer 300, a bus 314 connects together a CPU (Central Processing Unit) 311, a ROM (Read Only Memory) 312, and a RAM (Random Access Memory) 313.

The bus 314 is also connected with an input/output interface 315. The input/output interface 315 is connected with an input unit 316, an output unit 317, a recording unit 318, a communication unit 319, and a drive 320.

The input section 316 includes a keyboard, a mouse, a microphone, and others, and the output unit 317 includes a display, a speaker, and others. The recording unit 318 is a hard disk, or a nonvolatile memory, for example. The communication unit 319 is a network interface, for example. The drive 320 drives a removable medium 321 such as a magnetic disk, an optical disk, a magneto-optical disk, a semiconductor memory, and others.

In the computer 300 configured as described above, the CPU 311 loads a program stored in the recording unit 318 in the RAM 313 via the input/output interface 315 and the bus 314 and executes it to carry out the series of processing described above, for example.

The program executed by the computer 300 (CPU 311) can be recorded onto the removable medium 321 as a package medium, for example, and provided. Moreover, the program can be provided via a wired or wireless transmission medium such as a local area network, the Internet, and digital satellite broadcast.

In the computer 300, by loading the removable medium 321 in the drive 320, the program can be installed in the recording unit 318 via the input/output interface 315. The program can also be received by the communication unit 319 via a wired or wireless transmission medium and installed in the recording unit 318. Alternatively, the program can be installed in advance in the ROM 312 or the recording unit 318.

It should be noted that the program to be executed by the computer 300 may be a program in which processing are carried out in time series in the order described in the specification or a program in which processing are carried out in parallel or at necessary timings when invoked, for example.

Here, the processing steps describing the program for causing the computer 300 to carry out the various types of processing do not necessarily need to be processed in time series in the order described as the flowcharts in the specification and also include processing that are carried out in parallel or individually (e.g., parallel processing or processing that uses object).

Further, the program may be processed by one computer, or may be processed dispersively by a plurality of computers. Alternatively, the program may be transferred to a remote computer to be executed.

Furthermore, in the specification, the system refers to a group of a plurality of constituent elements (apparatus, module (component), etc.), and whether all constituent elements are provided in the same casing is irrelevant. Therefore, a plurality of apparatuses that are accommodated in different casings and connected via a network and a single apparatus in which a plurality of modules are accommodated in a single casing are both referred to as system.

It should be noted that the embodiment of the present disclosure is not limited to the embodiment described above and can be variously modified without departing from the gist of the present disclosure.

For example, the present disclosure can take a cloud computing configuration in which one function is shared and processed cooperatively by a plurality of apparatuses via a network.

Moreover, the steps described in the flowcharts can be assigned to and executed by a plurality of apparatuses instead of executing them by a single apparatus.

Furthermore, when a single step includes a plurality of processing, the plurality of processing included in the single step can be assigned to and executed by a plurality of apparatuses instead of executing them by a single apparatus.

It should be noted that the present disclosure may also take the following configurations.

(1) An information processing apparatus, including:
a message registering unit configured to register a first message with video of a first user, the first message being a notification from the first user to a second user who is not in the same space with the first user at the same time; and
a message reproducing unit configured to reproduce a second message with video in which the first user and the second user are present at the same time, the second message being a response to the first message from the second user.

(2) The information processing apparatus according to (1), in which
the second message includes composite video obtained by combining video of the first user and video of the second user.

(3) The information processing apparatus according to (1) or (2), in which
the message reproducing unit is configured to reproduce the first message, and
the message registering unit is configured to register the second message while the first message is reproduced.

(4) The information processing apparatus according to (2) or (3), in which
in the composite video, the video of the first user and the video of the second user are in the same space.

(5) The information processing apparatus according to any one of (2) to (4), in which
the message registering unit is configured to separate the video of each user from background video and to register the first message, and
the message reproducing unit is configured to reproduce the composite video obtained by combining video of a plurality of users with background video.

(6) The information processing apparatus according to any one of (2) to (5), further including
a position detection unit configured to detect a position of a user in space, wherein
the message reproducing unit is configured to reproduce the composite video in which video of the user is adjusted depending on the detected position of the user.

(7) The information processing apparatus according to (6), in which
a display position of the video of the user in the composite video is adjusted depending on the detected position of the user.

(8) The information processing apparatus according to (6), in which
transparency of the video of the user in the composite video is adjusted depending on the detected position of the user.

(9) The information processing apparatus according to any one of (2) to (6), in which
arrangement order of the video of the user in the composite video is adjusted depending on registration time of a message.

(10) The information processing apparatus according to any one of (2) to (5), in which
arrangement order of the video of the user in the composite video is adjusted depending on user's setting.

(11) The information processing apparatus according to any one of (1) to (10), in which
the message reproducing unit is configured to reproduce the composite video that is adjusted, in a case where video of a plurality of users is overlapped with each other, so that video of each user is not overlapped with each other.

(12) An information processing method for an information processing apparatus, comprising: by the information processing apparatus,
registering a first message with video of a first user, the first message being a notification from the first user to a second user who is not in the same space with the first user at the same time; and
reproducing a second message with video in which the first user and the second user are present at the same time, the second message being a response to the first message from the second user.

(13) A program that causes a computer to function as:
a message registering unit configured to register a first message with video of a first user, the first message being a notification from the first user to a second user who is not in the same space with the first user at the same time; and
a message reproducing unit configured to reproduce a second message with video in which the first user and the second user are present at the same time, the second message being a response to the first message from the second user.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
at least one processor configured to:
register a first message at a first time, wherein the first message includes a first video of a first user, wherein the first message is a notification from the first user to a second user who is unavailable in a space where the first video is recorded at the first time;
control a display device to display the first message at a second time,
wherein the displayed first message is for view of the second user;
register a second message based on the viewed first message,
wherein the second message includes a second video of the second user,
wherein the second video of the second user corresponds to a live video;
generate a composite video based on a combination of the first video including the first user and the second video including the second user,
wherein the second message is a response to the first message;
detect a first position of the first user and a second position of the second user in the composite video;

determine a first distance between the second position of the second user and a third position of the second user; and adjust the second video of the second user to displace the second user in the composite video from the second position to the third position, based on the determined first distance.

2. The information processing apparatus according to claim 1,
wherein in the composite video, the second video of the second user is recorded in the space where the first video is recorded.

3. The information processing apparatus according to claim 1,
wherein the at least one processor is further configured to:
separate a background video and the first video of the first user from the first message;
separate the background video and the second video of the second user from the second message; and
combine the background video with the first video of the first user and the second video of the second user to generate the composite video.

4. The information processing apparatus according to claim 1, wherein the at least one processor is further configured to adjust transparency of one of the first video or the second video in the composite video based on the detected first position of the first user and the detected second position of the second user.

5. The information processing apparatus according to claim 1,
wherein the at least one processor is further configured to adjust an order of layers in the composite video based on at least one of the first time at which the first message including the first video is registered or the second time at which the second message including the second video is registered, and
wherein the first time is different from the second time.

6. The information processing apparatus according to claim 5,
wherein the at least one processor is further configured to adjust the order of the layers in the composite video based on settings of the second user.

7. The information processing apparatus according to claim 5,
wherein the layers in the composite video corresponds to the first video of the first user and the second video of the second user.

8. The information processing apparatus according to claim 1,
wherein the at least one processor is further configured to store information of at least one of a source or a destination associated with each of the first user and the second user in a database, and
wherein the second message is reproduced based on the information stored in the database.

9. The information processing apparatus according to claim 1,
wherein the at least one processor is further configured to detect the first position of the first user as a three-dimensional position of the first user in the space where the first video is recorded.

10. The information processing apparatus according to claim 1,
wherein the at least one processor is further configured to:
register a third message at a third time, wherein the third message includes a third video of a third user;

generate a composite video based on a combination of the first video, the second video, and the third video;
detect a fourth position of the third user in the composite video; and
determine a second distance between the fourth position of the third user and a fifth position of the third user; and
adjust the third video of the third user to displace the third user in the composite video from the fourth position to the fifth position, based on the determined second distance,
wherein the second distance is greater than the first distance.

11. An information processing method, comprising:
in an information processing apparatus:
registering a first message at a first time, wherein the first message includes a first video of a first user, wherein the first message is a notification from the first user to a second user who is unavailable in a space where the first video is recorded at the first time;
controlling a display device to display the first message at a second time,
wherein the displayed first message is for view of the second user;
registering a second message based on the viewed first message,
wherein the second message includes a second video of the second user,
wherein the second video of the second user corresponds to a live video;
generating a composite video based on a combination of the first video including the first user and the second video including the second user,
wherein the second message is a response to the first message;
detecting a first position of the first user and a second position of the second user in the composite video;
determining a first distance between the second position of the second user and a third position of the second user; and
adjusting the second video of the second user to displace the second user in the composite video from the second position to the third position, based on the determined first distance.

12. A non-transitory computer-readable medium having stored thereon computer-executable instructions, which when executed by a processor of an information processing apparatus, cause the information processing apparatus to execute operations, the operations comprising:
registering a first message at a first time, wherein the first message includes a first video of a first user, wherein the first message is a notification from the first user to a second user who is unavailable in a space where the first video is recorded at the first time;
controlling a display device to display the first message at a second time,
wherein the displayed first message is for view of the second user;
registering a second message based on the viewed first message,
wherein the second message includes a second video of the second user,
wherein the second video of the second user corresponds to a live video;

generating a composite video based on a combination of the first video including the first user and the second video including the second user,
wherein the second message is a response to the first message;
detecting a first position of the first user and a second position of the second user in the composite video;
determining a first distance between the second position of the second user and a third position of the second user; and
adjusting the second video of the second user to displace the second user in the composite video from the second position to the third position, based on the determined first distance.

* * * * *